(12) United States Patent
Matsuzaki et al.

(10) Patent No.: US 7,247,970 B2
(45) Date of Patent: Jul. 24, 2007

(54) DRIVE METHOD FOR PIEZOELECTRIC ACTUATOR, DRIVE APPARATUS FOR PIEZOELECTRIC ACTUATOR, ELECTRONIC DEVICE, CONTROL PROGRAM FOR DRIVE APPARATUS FOR PIEZOELECTRIC ACTUATOR, AND RECORDING MEDIUM

(75) Inventors: Jun Matsuzaki, Shiojiri (JP); Takashi Kawaguchi, Shiojiri (JP); Reiko Nagahama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 38 days.

(21) Appl. No.: 11/171,183

(22) Filed: Jul. 1, 2005

(65) Prior Publication Data

US 2006/0001330 A1 Jan. 5, 2006

(30) Foreign Application Priority Data

Jul. 2, 2004 (JP) ............................. 2004-196741
Jul. 23, 2004 (JP) ............................. 2004-215905

(51) Int. Cl.
*H01L 41/08* (2006.01)

(52) U.S. Cl. ........................... 310/316.02; 310/316.01; 310/323.02

(58) Field of Classification Search ........... 310/316.01, 310/316.02, 323.02
See application file for complete search history.

(56) References Cited

U.S. PATENT DOCUMENTS

| | | | | |
|---|---|---|---|---|
| 4,833,358 | A * | 5/1989 | Suzuki et al. .......... | 310/316.02 |
| 5,214,339 | A * | 5/1993 | Naito .................... | 310/316.02 |
| 5,661,359 | A * | 8/1997 | Katsuragawa .......... | 310/316.01 |
| 5,955,819 | A | 9/1999 | Takano et al. | |
| 6,107,720 | A * | 8/2000 | Atsuta .................... | 310/316.01 |
| 6,229,245 | B1 * | 5/2001 | Kitani ..................... | 310/316.02 |
| 6,376,965 | B1 * | 4/2002 | Kataoka et al. ............. | 310/317 |
| 6,809,458 | B2 * | 10/2004 | Matsushita et al. ..... | 310/316.01 |
| 6,841,919 | B2 * | 1/2005 | Akahane et al. ........ | 310/316.01 |
| 7,116,033 | B2 * | 10/2006 | Seki et al. ................... | 310/317 |
| 7,119,475 | B2 * | 10/2006 | Matsuzaki et al. ...... | 310/316.01 |
| 2004/0262925 | A1 | 12/2004 | Seki et al. | |

FOREIGN PATENT DOCUMENTS

| | | |
|---|---|---|
| EP | 0602635 A | 6/1994 |
| EP | 0624911 A | 11/1994 |
| EP | 0693821 A | 1/1996 |
| EP | 0261810 A | 3/1998 |
| EP | 1526634 A | 4/2005 |
| WO | WO-03/067746 A | 8/2003 |

* cited by examiner

*Primary Examiner*—Mark Budd
(74) *Attorney, Agent, or Firm*—Global IP Counselors, LLP

(57) ABSTRACT

A frequency of a drive signal supplied to a piezoelectric element is swept within a specific range, a detection signal indicating the vibrating state of a vibrating member is detected, and the sweep speed of the drive signal frequency supplied to the piezoelectric element is controlled based on this detection signal. Thus, even if nonuniformities occur in the drive frequency of the piezoelectric element due to fluctuations in the surrounding temperature or the load, such nonuniformities can be overcome without any adjustments, and the piezoelectric element can be reliably driven. Also, since the sweep speed of the drive signal frequency is at a high speed when the vibrating member is in a non-drive state, needless drive signal output time during which the piezoelectric element cannot be driven can be reduced, needless power consumption can be curtailed, and nonuniformities in the drive speed of the driven object can also be reduced.

19 Claims, 11 Drawing Sheets

| SWEEPING | SWEEP SPEED | | RESOLUTION | |
|---|---|---|---|---|
| DIRECTION | HIGH | LOW | 12bit | 10bit |
| DOWN | 1MHz | 100kHz | 10.0 | 5.7 |
| | | 500kHz | 5.0 | 2.8 |
| | | 1MHz | 1.0 | 0.6 |
| UP | | 100kHz | 3.3 | 2.3 |
| | | 500kHz | 1.7 | 1.2 |
| | | 1MHz | 0.3 | 0.2 |

FIG.11

DRIVE METHOD FOR PIEZOELECTRIC ACTUATOR, DRIVE APPARATUS FOR PIEZOELECTRIC ACTUATOR, ELECTRONIC DEVICE, CONTROL PROGRAM FOR DRIVE APPARATUS FOR PIEZOELECTRIC ACTUATOR, AND RECORDING MEDIUM

CROSS-REFERENCE TO RELATED APPLICATIONS

This application claims priority to Japanese Patent Application No. 2004-196741 and 2004-215905. The entire disclosure of Japanese Patent Application No. 2004-196741 and 2004-215905 are hereby incorporated herein by references.

BACKGROUND OF THE INVENTION

1. Field of the Invention

The present invention generally relates to a drive method for a piezoelectric actuator. More specifically, the present invention relates to a drive method for a piezoelectric actuator, a drive apparatus for a piezoelectric actuator, an electronic device, a control program for the drive device of a piezoelectric actuator, and a recording medium.

2. Background Information

Piezoelectric elements have an excellent conversion ratio of electrical energy to mechanical energy, and also have excellent responsiveness. Various piezoelectric actuators that utilize the piezoelectric effects of piezoelectric elements have therefore been recently under development. These piezoelectric actuators are applied to a field that includes various electronic devices, such as piezoelectric buzzers, inkjet heads in printers, ultrasonic motors, electronic timepieces, and portable devices.

However, in piezoelectric actuators, the resonance frequency fluctuates due to the influence of the surrounding temperature, the load, and the like. Therefore, the frequency of the drive signal capable of driving the piezoelectric actuator also fluctuates according to the surrounding temperature, the load, and the like.

Examined Patent Application (Kokoku) No. 5-16272 (hereinafter referred to as Prior Art 1) discloses a system in which the frequency of the drive signal is swept or varied within a wide range that includes the frequency range of the fluctuating drive signal, and the motor is reliably driven. Prior Art 1 is hereby incorporated by reference. Specifically, in Prior Art 1, the sweep voltage of a triangular wave or a sawtooth wave is outputted to a voltage control oscillator, the oscillation frequency of the voltage control oscillator is constantly varied within a range of $f_L$ to $f_H$, and a frequency wherein a piezoelectric vibrating element can be driven can always be ensured, making it possible to drive reliably the piezoelectric vibrating element (piezoelectric actuator).

However, as described in Prior Art 1, when the oscillation frequency is swept, the frequency range in which the piezoelectric vibrating element can be driven is actually part of the frequency range $f_L$ to $f_H$, and this drive frequency range varies depending on fluctuations in the surrounding temperature, the load, and the like. Therefore, since the drive signal output from the voltage control oscillator continues even in frequency ranges in which the piezoelectric vibrating element is not driven, unnecessary power consumption occurs.

Further, since the frequency range in which the piezoelectric vibrating element can be driven fluctuates due to fluctuations in the surrounding temperature and the load, the intervals (times) during which the piezoelectric vibrating element is actually driven also fluctuate while the oscillation frequency is swept from $f_L$ to $f_H$. Therefore, when the driven object is rotated or moved by the piezoelectric vibrating element, nonuniformities occur in the amount by which the driven object is driven per unit time. Specifically, the drive speed and driving efficiency cannot be improved.

Further, in piezoelectric actuators, individual differences and characteristic differences occur as a result of nonuniformities in manufacturing the piezoelectric element, as well as nonuniformities in the angle of contact between the piezoelectric element and the driven object, the contact pressure, and the like.

Therefore, as described in Prior Art 1, when the oscillation frequency is swept, problems are encountered with the occurrence of nonuniformities in the speed at which the driven object is driven by the piezoelectric actuator, for example, in the rotating speed of the rotor when a rotor is rotatably driven, as a result of individual differences and the like in the piezoelectric actuator.

Problems with the occurrence of nonuniformities in the drive speed are also encountered when the piezoelectric actuator degrades.

In order to eliminate such nonuniformities in the drive speed and to drive the driven object in a stable manner, it is necessary to have a speed adjustment mechanism in which the drive state of the driven object, for example, the rotational frequency over a specific time in a case in which the driven object is a rotor, is determined. It is also necessary that the driving of the piezoelectric actuator is feedback-controlled on the basis of this information, which leads to problems of complicating the control and increasing costs.

In view of the above, it will be apparent to those skilled in the art from this disclosure that there exists a need for an improved a piezoelectric actuator, a drive apparatus for a piezoelectric actuator, an electronic device, a control program for the drive device of a piezoelectric actuator, and a recording medium. This invention addresses this need in the art as well as other needs, which will become apparent to those skilled in the art from this disclosure.

SUMMARY OF THE INVENTION

A first object of the present invention is to provide a drive method for a piezoelectric actuator, a drive apparatus for a piezoelectric actuator, an electronic device having this piezoelectric actuator, a control program for the drive device of a piezoelectric actuator, and a recording medium on which this control program is recorded, wherein the piezoelectric actuator can be reliably driven, the power consumption can be reduced, and nonuniformities in the speed at which the driven object is driven by the piezoelectric actuator can be reduced. In addition to the first object, a second object of the present invention is to provide a drive method for a piezoelectric actuator, a drive apparatus for a piezoelectric actuator, an electronic device having this piezoelectric actuator, a control program for the drive device of a piezoelectric actuator, and a recording medium on which this control program is recorded, wherein the driven object can be driven at a specific speed, control can be simplified, and cost increases can be suppressed, even when nonuniformities occur in the characteristics of the piezoelectric actuator.

A drive method for a piezoelectric actuator according to a first aspect of the present invention use a piezoelectric actuator having a vibrating body that is vibrated by the application of a drive signal with a specific frequency to a piezoelectric element, and a contact section provided on the vibrating body and pressed against the driven object. Further, the frequency of the drive signal supplied to the piezoelectric element is swept within a specific range, a detection signal indicating the vibrating state of the vibrating body is detected, and the speed at which the frequency of the drive signal supplied to the piezoelectric element is swept is controlled based on this detection signal. In this aspect of the present invention, since the frequency of the drive signal is varied or swept within a specific range, the piezoelectric element can be reliably driven as long as the element is driven within this frequency range. Also, since the drive signal is constantly swept within a specific frequency range, the drive frequency of the piezoelectric element may be nonuniform due to fluctuations in the surrounding temperature, noise, and load, but it is possible to overcome such nonuniformities without making adjustments. Therefore, there is no need to provide the drive apparatus with a determination circuit for determining fluctuations in the surrounding temperature, noise, and load, or an adjustment circuit for adjusting the frequency of the drive signal on the basis of such determination data, and the configuration of the drive apparatus can be simplified.

Furthermore, since the sweep speed of the drive signal frequency is controlled based on the detection signal that indicates the vibrating state of the vibrating body, the speed at which the drive signal is swept can be increased when the amount by which the vibrating body vibrates is small and the driven object is at rest, and the speed can be reduced when the amount by which the vibrating body vibrates is large and the driven object is in a drive state. Needless drive signal output time during which the driven object cannot be driven can thereby be shortened, needless power consumption can be curtailed, and efficiency can be improved. Further, since the non-drive state can be shortened, nonuniformities over a specific drive time (for example, 1 minute) can be reduced, discrepancies (nonuniformities) in the speed at which the driven object (driven member) is driven by the vibrating body can be reduced, and high-speed driving can be achieved, even with fluctuations in the load and the like.

In the drive method for a piezoelectric actuator according to a second aspect of the present invention is the method of the first aspect, wherein it is preferable that a drive state in which the vibrating member vibrates to drive the drive object, or a non-drive state in which the drive object is not driven is detected on the basis of the detection signal. Further, when the driven object is in a drive state, the sweep speed of the drive signal frequency is compared with the speed when the drive object is in a non-drive state and is set to a lower speed.

According to such a configuration, since adjustment of the sweep speed of the drive signal frequency can be switched in the drive state or non-drive state of the driven object, the adjustment process can be made simple and the configuration of the control circuits and the like for adjusting the speed can also be simplified.

The sweep speed of the drive signal frequency could be set to a lower speed at least when the driven object is in the drive state than when it is in the non-drive state, and the speed during the drive state may be set to one level or may be varied among a plurality of levels. In the drive state, if the sweep speed of the drive signal frequency can be varied among a plurality of levels, more effective control is made possible by lowering the frequency sweep speed to a state in which the piezoelectric can be effectively driven.

A drive method for a piezoelectric actuator according to a third aspect of the present invention is the method of the second aspect, wherein it is preferable that when the amplitude of the detection signal is compared with a reference voltage for amplitude detection and the amplitude is less than the reference voltage for amplitude detection, the drive objected is determined to be in the non-drive state and the sweep speed of the drive signal frequency is set to a first speed setting. Further, when the amplitude is equal to or greater than the reference voltage for amplitude detection, the driven object is determined to be in the drive state and the sweep speed of the drive signal frequency is set to a second speed setting that is lower than the first speed setting.

When the drive state of the driven object is determined based on the detection signal, for example, the drive state can be determined by changes in the amplitude (voltage value) of the detection signal or in the electric current value, or it can be determined by the phase difference between the drive signal and the detection signal or the phase difference among a plurality of detection signals. However, in the present invention, the circuit configuration can be simplified if the drive state is determined by comparing the amplitude (voltage) of the detection signal with the reference voltage.

The reference voltage for amplitude detection should be set based on the amplitude of the detection signal when the frequency of the drive signal reaches the frequency range in which the driven object is driven under normal usage conditions. When the temperature, load, and the like differ from the conditions during such a setting, the driven object is sometimes not actually driven even if the amplitude is equal to or greater than the reference voltage for amplitude detection. However, in such a case, the frequency of the drive signal draws near the frequency range in which the driven object is driven; therefore, if the drive signal is inputted at such a time, the driven object begins to be driven after a brief time. Therefore, when the amplitude is equal to or greater than the reference voltage for amplitude detection, the fact that the driven object is determined to be in the drive state does not necessarily mean only that the driven object is actually being driven, but may also mean that the frequency of the drive signal is near the frequency range in which the driven object is driven, and the object will begin to be driven shortly.

A drive method for a piezoelectric actuator according to a fourth aspect of the present invention is the method of the third aspect, wherein it is preferable that the first speed setting be 2 to 100 times the second speed setting. If it is less than 2 times greater, the speed difference is not very large, which reduces efficiency. However, if it is more than 100 times greater, when the speed is switched from a high speed to a low speed on the basis of the amplitude of the detection signal, for example, it is difficult to switch to the optimal frequency because the change in speed is too large. Therefore, keeping the speed difference in a range of 2 to 100 times can provide the most efficient control.

A drive method for a piezoelectric actuator according to a fifth aspect of the present invention is the method of the first aspect, wherein it is preferable that the drive speed of the piezoelectric actuator is adjusted by switching the direction in which the frequency of the drive signal is swept.

In this aspect of the present invention, since the direction in which the frequency of the drive signal is swept is switched, the drive speed of the piezoelectric actuator can be easily adjusted. For example, with a piezoelectric actuator that is operated by combining longitudinal oscillation and bending oscillation, the longitudinal resonance/bending resonance frequency range of the piezoelectric actuator, that is, the frequency range to induce excitation that applies a drive force to the driven object, differs depending on the sweep direction because of the characteristics of the piezoelectric actuator. Specifically, when the sweep direction is down, that is, when a drive signal with a high frequency is initially inputted and the frequency is then reduced, the range of longitudinal-bending resonance points is expanded and the range of rotation increases because the frequency is shifted to a frequency with a low longitudinal resonance point. Therefore, the longitudinal oscillation-bending resonance frequency range is broader when the sweep direction is down than when the sweep direction is up, and the drive speed of the piezoelectric actuator can be increased proportionately. Therefore, when the drive speed of the piezoelectric actuator is increased, the sweep direction may be down, and when the drive speed is reduced, the sweep direction may be up.

Even if nonuniformities in the drive speed occur due to individual differences and characteristic differences in the individual piezoelectric actuators, such nonuniformities can thereby be reduced by a simple operation, and it is possible to provide safely piezoelectric actuators capable of driving driven objects at a specific speed.

Furthermore, it is possible to overcome easily the nonuniformities of the drive speed due to deterioration of the piezoelectric actuator, and the drive speed can be easily stabilized as long as the control of the sweep direction can be controlled while the piezoelectric actuator is driven. It is also possible to control easily the switching of the drive speed according to the operation of the user or the state of the driven object.

A drive method of the piezoelectric actuator according to a sixth aspect of the present invention is the method of the first aspect, wherein the drive speed of the piezoelectric actuator is adjusted by switching the sweep speed of the drive signal frequency among a plurality of levels. More specifically, the drive speed of the piezoelectric actuator is adjusted by switching the sweep speed of the drive signal frequency among a plurality of levels when the driven object is in a drive state. For example, the driven object is determined to be either in a drive state or a non-driven state on the basis of the detection signal indicating the vibrating state of the vibrating member. Further, the sweep speed is set to a first speed setting during the non-drive state and is set to a second speed setting that is lower than the first speed setting during the drive state, in which case the drive speed of the piezoelectric actuator may be adjusted by switching the second speed setting among a plurality of levels.

In this aspect of the present invention, since the sweep speed of the drive signal frequency sent to the piezoelectric element when the driven object is in a drive state is switched among a plurality of levels, the drive speed of the piezoelectric actuator can be easily adjusted. The sweep speed of the drive signal frequency is the amount by which the drive frequency varies per unit time when the frequency of the drive signal is varied; for example, the sweep speed is 100 kHz/sec when the frequency of the drive signal is varied by 100 kHz in 1 second.

The initial motion of the piezoelectric actuator is smoother with a greater amount of time in which rotation begins, depending on the startup time and the inertia of the driven object (driven member). Thus, the driven object can be driven more effectively. Specifically, the piezoelectric actuator can be driven faster when the sweep speed is low, namely, the time required for one sweep cycle being longer, than in the case of a high speed that is greater than the low speed. Therefore, the sweep speed may be reduced when the drive speed of the piezoelectric actuator is increased, and the sweep speed may be increased when the drive speed of the piezoelectric actuator is reduced.

As a result, it is possible to supply safely piezoelectric actuators capable of driving driven objects at a specific speed regardless of the individual differences and characteristic differences in the individual piezoelectric actuators, and to overcome easily the nonuniformities of the drive speed due to deterioration of the piezoelectric actuators. Further, it is also possible to make it simpler to control the switching of the drive speed according to the operation of the user or the state of the driven object in the same manner as in the drive method for switching the sweep direction previously described.

Furthermore, since the sweep speed can easily be mechanically adjusted among a plurality of levels and the speed can be varied within the widest range, the drive speed of the piezoelectric actuator can be easily adjusted to the desired speed by varying the sweep speed.

The range in which the sweep speed is adjusted may be set according to the resonance frequency of longitudinal oscillation and bending oscillation set by the size and the like of the piezoelectric actuator. To give an example, the sweep speed may be set to about 100 kHz/sec ~1 MHz/sec. Normally, the sweeping cycle also includes a range in which the driven object cannot be driven, thus, if the sweep speed is too low at about 100 kHz/sec or less, it is clear to an observer that the driven object (driven member) moves intermittently. If the sweep speed is too high at about 1 MHz or greater, the sweep speed (clock speed) is higher than with a single drive signal pulse with a frequency range of about 240 to 300 kHz, for example, and the speed variation is saturated. Therefore, the range in which the sweep speed is adjusted is preferably set according to the resonance frequency of longitudinal oscillation and bending oscillation set by the size and the like of the piezoelectric actuator.

Further, the sweep speed may be adapted to be capable of being switched between at least two levels, but is preferably capable of being switched between three or more levels in order to control accurately the drive speed of the piezoelectric actuator. For example, the sweep speed may be adapted to be capable of being switched between the following three levels: 100 kHz/sec, 500 kHz/sec, and 1 MHz/sec.

A drive method for a piezoelectric actuator according to a seventh aspect of the present invention is the method of the seventh aspect, wherein the drive speed of the piezoelectric actuator is adjusted by switching the resolution of the drive signal frequency.

In this aspect of the present invention, the drive speed of the piezoelectric actuator can be easily adjusted because the frequency resolution of the drive signal is switched. The frequency resolution is the number of increments in the frequency sweep range, and the amount by which the sweep frequency varies is lower with a high resolution than with a low resolution (a resolution lower than the aforementioned high resolution).

When the frequency of the drive signal is swept using an up-down counter, this frequency resolution can be higher if a 12 bit counter is used than if a 10 bit counter is used. Specifically, if the sweep frequency range is 240 to 300 kHz, the amount by which the sweep frequency varies is $60/4096 \approx 0.015$ kHz with a 12 bit counter, and is $60/1024 \approx 0.059$ kHz with a 10 bit counter. Therefore, the amount by which the sweep frequency varies can be reduced with a higher resolution. The amount by which the piezoelectric actuator is driven is a cumulative value (integrated value) in the relation of the driven amount to the frequency of the drive signal, and the cumulative value is therefore further increased and the drive speed improved with a more precise resolution, that is, with a higher resolution.

Therefore, the sweep frequency variation may be reduced by increasing the frequency resolution when the drive speed of the piezoelectric actuator is increased, and the frequency resolution may be reduced, and the sweep frequency variation increased when the drive speed is reduced. It is thereby possible to supply safely piezoelectric actuators capable of driving driven objects at a specific speed regardless of the individual differences and characteristic differences in the individual piezoelectric actuators, and to overcome easily the nonuniformities of the drive speed due to deterioration of the piezoelectric actuators. Further, it is also possible to make it simpler to control the switching of the drive speed according to the operation of the user or the state of the driven object in the same manner as in the above-described method for adjusting the drive speed.

A drive method for a piezoelectric actuator according to an eighth aspect of the present invention is the method of the first aspect, wherein the drive speed of the piezoelectric actuator is adjusted by controlling at least one parameter selected from among the sweep direction of the drive signal frequency, the sweep speed, and the frequency resolution.

Controlling the sweep speed in the present invention means that from among the sweep speeds controlled based on the detection signal, the sweep speed controlled when the driven object is determined to be in a drive state according to the detection signal in particular is further switched among a plurality of levels.

In this aspect of the present invention, at least one parameter selected from among the sweep direction of the drive signal frequency, the sweep speed, and the frequency resolution is controlled, making it possible to supply safely piezoelectric actuators capable of driving driven objects at a specific speed regardless of the individual differences and characteristic differences in the individual piezoelectric actuators, and to overcome easily the nonuniformities of the drive speed due to deterioration of the piezoelectric actuators. Further, it is also possible to make it simpler to control the switching of the drive speed according to the operation of the user or the state of the driven object in the same manner as in the previously described drive methods for separately controlling these factors.

At this time, if two of the sweep direction, the sweep speed, and the frequency resolution are controlled, many levels are possible for the drive speed of the piezoelectric actuator to be set, and the drive speed can therefore be precisely controlled.

Further, if all three of the sweep direction, the sweep speed, and the frequency resolution are controlled, even more levels are possible for the drive speed of the piezoelectric actuator to be set, and the drive speed can therefore be more precisely controlled.

For example, in cases in which the sweep direction can be switched between two directions of down and up, the sweep speed can be switched between three levels of low, medium, and high, and the frequency resolution can be switched between two levels of a high resolution and a low resolution. Thus, the drive speed of the piezoelectric actuator can be switched between 2×3=6 levels if the sweep direction and the sweep speed are controlled. Furthermore, if all three of the sweep direction, the sweep speed, and the frequency resolution are controlled, then the drive speed of the piezoelectric actuator can be switched between 2×3×2=12 levels.

A drive method for a piezoelectric actuator according to a ninth aspect of the present invention is the method of the eighth aspec, wehrein it is preferable that the drive speed of the piezoelectric actuator is adjusted by first setting the sweep direction of the drive signal frequency, then setting the sweep speed of the drive signal frequency, and lastly setting the resolution of the drive signal frequency.

The speed difference brought about by the switching of the sweep direction is large, and therefore a wide speed of adjustment range can be set by first setting the sweep direction. Also, it is easy to adjust the sweep speed because the sweep speed can also be easily set between three or more levels. Therefore, it is extremely simple to adjust the drive speed of the piezoelectric actuator by adopting the adjustment sequence of the present invention.

A drive method for a piezoelectric actuator according to a tenth aspect of the present invention is the method of the eight or ninth aspect, wherein it is preferable that the sweep direction of the frequency be capable of being switched to the up direction or the down direction; the sweep speed of the frequency be capable of being switched between at least two levels of a high speed and a low speed; the frequency resolution of the frequency be capable of being switched between at least two levels of a high resolution and a low resolution; the sweep direction be set to down when the frequency sweep direction is switched and the piezoelectric actuator is driven in a state in which the sweep speed is set to low and the resolution is set to high, and the desired speed of the piezoelectric actuator is equal to or less than the drive speed in a case in which the sweep direction is set to down, but greater than the drive speed in a case in which the sweep direction is set to up; and the sweep direction be set to up when the drive speed is equal to or less than the speed in a case in which the sweep direction is set to up.

If the sweep speed is first set to low and the resolution is set to high, the drive speed is at its highest in both sweep directions. Therefore, if the sweep direction is switched between down and up in this state, the maximum adjustable speed is reached in either sweep direction, and the sweep direction can be easily set by comparing with the desired speed.

The drive apparatus for a piezoelectric actuator according to am eleventh aspect of the present invention uses a drive signal supplied to a piezoelectric element in a piezoelectric actuator. The piezoelectric actuator has a vibrating body that is vibrated by the application of a drive signal with a specific frequency to a piezoelectric element, and a contact section provided on the vibrating body and pressed against the driven object. Further, a frequency control device is provided to sweep the frequency of the drive signal supplied to the present invention element within a specific range. The frequency control device also detects a detection signal indicating the vibrating state of the vibrating body, and controls the speed at which the frequency of the drive signal supplied to the piezoelectric element is swept on the basis of this detection signal.

In this aspect of the present invention, since the frequency of the drive signal is varied or swept within a specific range, the piezoelectric element can be reliably driven as long as the element is driven within this frequency range.

Also, since the drive signal is constantly swept within a specific frequency range, it is possible to overcome the nonuniformities without performing adjustments if the drive frequency of the piezoelectric element is nonuniform due to fluctuations in the surrounding temperature, external disturbances, the load, and the like. Therefore, there is no need to provide the drive apparatus with detection circuits for detecting fluctuations in the surrounding temperature, external disturbances, the load, and the like, or adjustment circuits for adjusting the frequency of the drive signal on the basis of this detected data. Thus, the configuration of the drive apparatus can be simplified.

Furthermore, since the sweep speed of the drive signal frequency is controlled based on the detection signal indicating the vibrating state of the vibrating element, the sweep speed of the drive signal frequency can be increased when the driven object is in a non-drive state, and decreased when the driven object is in a drive state. Needless drive signal output time during which the driven object cannot be driven can thereby be curtailed, needless power consumption can be curtailed, and efficiency can be improved. Also, since the time of the non-drive state can be curtailed, nonuniformities in the drive time over a specific time (for example, one second) can be reduced even if fluctuations occur in the load or the like. Further, discrepancies (nonuniformities) in the drive speed of the driven object that is driven by the vibrating member can also be reduced, and high-speed driving can be achieved.

It is preferable that the frequency control device detect a drive state wherein the vibrating member vibrates to drive the driven object on the basis of the detection signal, or a non-drive state wherein the driven object is not driven, and when the driven object is in the drive state, the sweep speed of the drive signal frequency is set lower than the speed when the driven object is in the non-drive state.

Also, it is preferable that the frequency control device compare the amplitude of the detection signal with a reference voltage for amplitude detection then determines the driven object to be in the non-drive state and sets the sweep speed of the drive signal frequency to a first speed setting when the amplitude is less than the reference voltage for amplitude detection. Further, it is also preferable that the frequency control device determine the driven object be in the drive state and sets the sweep speed of the drive signal frequency to a second speed setting, which is lower than the first speed setting, when the amplitude is equal to or greater than the reference voltage for amplitude detection.

At this time, the first speed setting is preferably equal to 2 to 100 times the second speed setting.

According to these aspects, the same operating effects can be obtained as in the drive method for a piezoelectric actuator according to the second through the fourth aspects.

A drive apparatus for a piezoelectric actuator according to a twelvth aspect of the present invention is the apparatus of the eleventh aspect, wherein the frequency control device has a frequency change control device to perform a control that increases or decreases the frequency of the drive signal, and a frequency change speed control device to control the sweep speed of the increase or decrease of the drive signal frequency. Further, the frequency change a control device performs control whereby the frequency of the drive signal is increased or reduced within a preset frequency range, and the frequency change speed control device controls the sweep speed of the drive signal frequency on the basis of the detection signal.

With this configuration, the change pattern of the drive signal frequency is set using the frequency change control device, and the sweep speed of the drive signal frequency is set using the frequency change speed control device. Therefore, since the increase pattern and the sweep speed can be independently set, control is simplified, various patterns and speed changes can be set together, and optimum control can be easily achieved for multiple piezoelectric actuators.

A drive apparatus for a piezoelectric actuator according to a thirteenth aspect of the present invention is the apparatus of the eleventh aspect, wherein it is preferable that the frequency control device be configured from a constant voltage circuit, an amplitude determination circuit, a voltage adjustment circuit, and a variable frequency oscillator. The constant voltage circuit outputs an amplitude determination reference voltage to determine the amplitude of the detection signal. The amplitude determination circuit to compare the reference voltage for amplitude detection outputted by the constant voltage circuit and the amplitude of the detection signal and outputs the comparison result signal. The voltage adjustment circuit to adjust the speed of change of the output voltage on the basis of the comparison result signal. The variable frequency oscillator is capable of varying the frequency of the output signal according to the voltage outputted from the voltage adjustment circuit.

With this configuration, it is possible to determine whether the driven object is in a drive state or non-drive state by comparing the reference voltage for amplitude detection outputted from the constant voltage circuit with the amplitude (voltage) of the determination signal, and to output the comparison result signal. The frequency of the drive signal can then be set by controlling the voltage value outputted from the voltage adjustment circuit on the basis of the comparison result signal, and the frequency sweep speed of the drive signal can be set by controlling the speed of change of the voltage outputted from the voltage adjustment circuit. Therefore, the frequency of the drive signal and the frequency sweep speed can be easily controlled with a high degree of precision.

A drive apparatus for a piezoelectric actuator according to a fourteenth aspect of the present invention is the apparatus of the thirteenth aspect, wherein it is preferable that the voltage adjustment circuit have a clock circuit, an up-down counter, a digital/analog converter, and a control circuit. The clock circuit is capable of outputting a plurality of clock signals with different frequencies. The a digital/analog converter sets the voltage value of the output voltage on the basis of the counter value of the up-down counter. The control circuit controls the counter value of the up-down counter on the basis of the clock signal. Further, the control circuit controls the change pattern of the up-down counter, and controls the total speed of the up-down counter by switching the clock signal used on the basis of the comparison result signal.

According to this aspect having the aforementioned configuration, the frequency of the drive signal can be controlled if the counter value of the up-down counter is controlled by the control circuit, and therefore various change patterns can be easily controlled. For example, the counter value can be controlled with a simple configuration in which the frequency of the drive signal is reduced to the minimum value from the set maximum value, and when the frequency again returns to the maximum value upon reaching the minimum value and a down pattern is performed to repeat the decrease to the minimum value. The initial value of the up-down counter is then set as the maximum value, a signal is inputted to the down input of the counter to reduce the counter value, and the counter need only be reset to the initial value when the counter reaches the minimum value. Also, since the frequency sweep speed of the drive signal is proportionate to the speed of change of the counter value, the frequency of the signal inputted to the counter can be easily achieved merely by switching the frequency of the clock signal outputted from the clock circuit.

A drive apparatus for a piezoelectric actuator according to a fifteenth aspect of the present invention is the apparatus of the eleventh aspect, wherein the frequency control device adjusts the speed at which the piezoelectric actuator is driven by switching the direction in which the frequency of the drive signal is swept.

This aspect of the present invention, since the direction in which the frequency of the drive signal is swept is switched, the speed at which the piezoelectric actuator is driven can easily be adjusted in the same manner as in the drive speed adjustment methods previously described. Therefore, it is possible to supply safely piezoelectric actuators capable of driving driven objects at a specific speed regardless of the individual differences and characteristic differences in the individual piezoelectric actuators, and to overcome easily the nonuniformities of the drive speed due to deterioration of the piezoelectric actuators. Further, it is also possible to make it simpler to control the switching of the drive speed according to the operation of the user or the state of the driven object in the same manner as in the previously described drive speed adjustment methods.

A drive apparatus for a piezoelectric actuator according to a sixteenth aspect of the present invention is the apparatus of the eleventh aspect, wherein it is preferable that the frequency control device adjust the speed at which the piezoelectric actuator is driven by switching the sweep speed of the drive signal frequency.

In this aspect of the present invention, since the sweep speed of the drive signal frequency is switched, the speed at which the piezoelectric actuator is driven can easily be adjusted in the same manner as in the drive speed adjustment methods previously described. Therefore, it is possible to supply safely piezoelectric actuators capable of driving driven objects at a specific speed regardless of the individual differences and characteristic differences in the individual piezoelectric actuators, to overcome easily the nonuniformities of the drive speed due to deterioration of the piezoelectric actuators, and to make it simpler to control the switching of the drive speed according to the operation of the user or the state of the driven object in the same manner as in the previously described drive speed adjustment methods.

A drive apparatus for a piezoelectric actuator according to a seventeenth aspect of the present invention is the apparatus of the eleventh aspect, wherein it is preferable that the frequency control device adjust the speed at which the piezoelectric actuator is driven by switching the resolution of the drive signal frequency.

In this aspect of the present invention, since the resolution of the drive signal frequency is switched, the speed at which the piezoelectric actuator is driven can easily be adjusted in the same manner as in the drive speed adjustment methods previously described.

Therefore, it is possible to supply safely piezoelectric actuators capable of driving driven objects at a specific speed regardless of the individual differences and characteristic differences in the individual piezoelectric actuators, to overcome easily the nonuniformities of the drive speed due to deterioration of the piezoelectric actuators, and to make it simpler to control the switching of the drive speed according to the operation of the user or the state of the driven object in the same manner as in the previously described drive speed adjustment methods.

A drive apparatus for a piezoelectric actuator according to an eighteenth aspect of the present invention is the apparatus of the eleventh aspect, wherein it is preferable that the frequency control device adjust the speed at which the piezoelectric actuator is driven by controlling at least one parameter selected from among the sweep direction of the drive signal frequency, the sweep speed, and the frequency resolution.

In this aspect of the present invention, at least one parameter selected from among the sweep direction of the drive signal frequency, the sweep speed, and the frequency resolution is controlled, making it possible to supply safely piezoelectric actuators capable of driving driven objects at a specific speed regardless of the individual differences and characteristic differences in the individual piezoelectric actuators, and to overcome easily the nonuniformities of the drive speed due to deterioration of the piezoelectric actuators. Further, it is also possible to make it simpler to control the switching of the drive speed according to the operation of the user or the state of the driven object in the same manner as in the drive speed adjustment methods.

A drive apparatus for a piezoelectric actuator according to a nineteenth aspect of the present invention is the apparatus of the eleventh aspect, wherein, it is preferable that the frequency control device have a sweep direction control unit, a sweep speed control unit, and a frequency control unit. The sweep direction control unit controls the sweep direction of the drive signal frequency. The sweep speed control unit controls the sweep speed of the drive signal frequency. The frequency control unit controls the resolution of the drive signal frequency.

In the invention with this configuration, the sweep direction of the drive signal frequency is set by the sweep direction control unit, the sweep speed of the drive signal frequency is set by the sweep speed control unit, and the frequency resolution of the drive signal is set by the frequency resolution control unit. Therefore, since the sweep direction, the sweep speed, and the frequency resolution can be set independently, control is simplified, the drive speed of the piezoelectric actuator can be set depending on various combinations, and the drive speed can be easily set to a specific speed even with individual differences in the piezoelectric actuators.

A drive apparatus for a piezoelectric actuator according to a twentieth aspect of the present invention is the apparatus of the eleventh aspect, wherein it is preferable that the frequency control device have a first variable frequency oscillator, a voltage adjustment circuit, a second variable frequency oscillator, and a control circuit. The first variable frequency oscillator outputs a clock signal and is capable of varying the frequency of the clock signal. The second variable frequency oscillator is capable of varying the frequency of an output signal by the voltage outputted from the voltage adjustment circuit. It is also preferable that the voltage adjustment circuit have an up-down counter whereby the clock signal outputted from the first variable frequency oscillator is inputted, and a digital/analog converter to set the voltage value of the output voltage on the basis of the counter value of this up-down counter. It is also preferable that the control unit have a sweep direction control unit, a sweep speed control unit, and a frequency resolution control unit. The sweep direction control unit to selects the sweep direction by switching the clock signal input to the up input or the down input of the up-down counter. The sweep speed control unit to controls the sweep speed by varying the frequency of the clock signal outputted from the first variable frequency oscillator. The frequency resolution control unit to controls the frequency resolution by setting the bit number of the up-down counter.

According to this aspect of the invention having this configuration, the control unit makes it possible to control the sweep direction by selecting the clock input of the up-down counter, to control the sweep speed by varying the frequency of the clock signal, and to control the frequency resolution by varying the bit number of the counter. Therefore, the sweep direction, the sweep speed, and the frequency resolution can all be controlled with an extremely simple configuration.

A electronic device according to a twenty-first aspect of the present invention has a piezoelectric actuator having a vibrating member that vibrates due to the application of a drive signal with a specific frequency to a piezoelectric element and a contact section that is provided on the vibrating member and that comes in contact with a driven object. The electric device also has a drive apparatus for this piezoelectric actuator.

In this aspect of the invention with this configuration, a piezoelectric actuator is provided that can achieve stable driving with low power consumption and with few nonuniformities in the drive speed. Thus, an electronic device can therefore be provided that is suitable for compact items and portability, particularly in wristwatches and the like.

Also, if a piezoelectric actuator is provided wherein the drive speed is easily adjusted, stable driving can be achieved regardless of the individual differences in the piezoelectric actuators in electronic devices that are suitable for compact size and portability, particularly in wristwatches and the like.

A control program for the drive apparatus for the piezoelectric actuator according to a twenty-second aspect of the present invention is a control program for the drive device of a piezoelectric actuator whereby a drive signal is supplied to a piezoelectric element in a piezoelectric actuator having a vibrating member that vibrates due to the application of a drive signal with a specific frequency to a piezoelectric element, and also having and a contact section that is provided on the vibrating member and that comes in contact with a driven object. Further, a computer incorporated into the drive apparatus is made to function as a frequency control device to sweep the frequency of the drive signal supplied to the piezoelectric element within a specific range, to detect a detection signal that indicates the vibrating conditions of the vibrating member, and to control the sweep speed of the drive signal frequency on the basis of the detection signal.

A control program for the drive apparatus for a piezoelectric actuator according to a twenty-third aspect of the present invention is the program of the twenty-second aspect, wherein the computer incorporated into the drive apparatus is made to function also as a frequency control device to adjust the drive speed of the piezoelectric actuator by controlling at least one parameter selected from among the sweep direction of the drive signal frequency, the sweep speed, and the frequency resolution.

A storage medium according to a twenty-fourth aspect of the present invention is a storage medium that can be read by a computer that stores the aforementioned program of the twenty-second or twenty-third aspect.

According to this aspect of the present invention, the power consumption of the piezoelectric actuator can be reduced, and highly efficient driving with few nonuniformities in the drive speed achieved in the same manner as in the previous descriptions by having the computer incorporated into the drive apparatus function as the devices previously described. If the devices are configured from the computer, the conditions can be easily varied merely by varying the program, and therefore the appropriate control according to the driven object can be easily performed. Also, if the configuration is designed so that the drive speed of the piezoelectric actuator is adjusted by controlling at least one parameter selected from among the sweep direction of the drive signal frequency, the sweep speed, and the frequency resolution, it is possible to supply safely piezoelectric actuators capable of driving driven objects at a specific speed regardless of the individual differences and characteristic differences in the individual piezoelectric actuators, to overcome easily the nonuniformities of the drive speed due to deterioration of the piezoelectric actuators, and to make it simpler to control the switching of the drive speed according to the operation of the user or the state of the driven object.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a view of a diagram showing the relationship between the sweep direction, the sweep speed, the frequency resolution, and the drive speed if the drive apparatus of the second embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First, an electronic timepiece that contains a date display mechanism driven by a piezoelectric actuator will be given as an example of an embodiment of the electronic timepiece.

1. Entire Configuration

Figure 1:
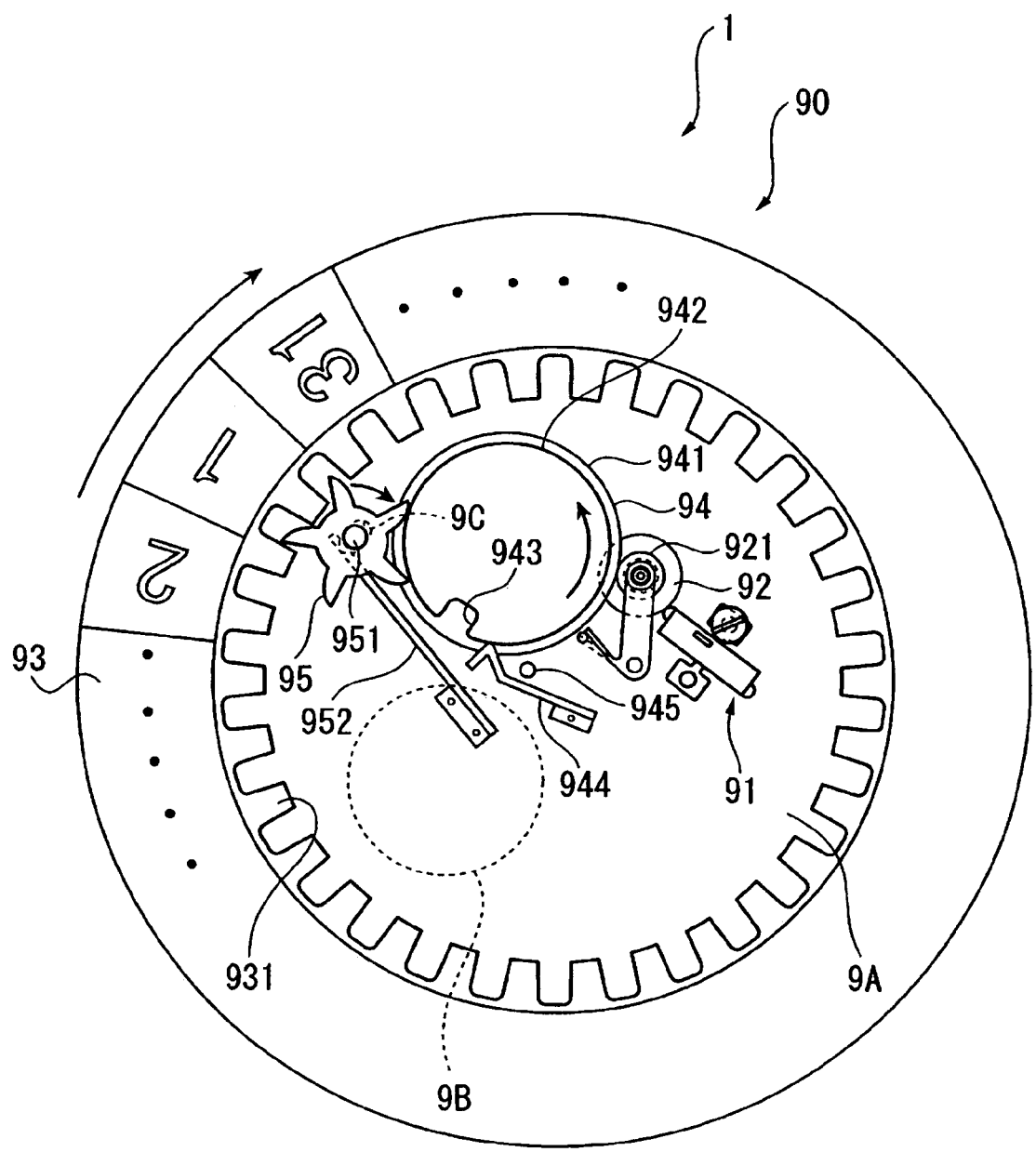
FIG. 1 is a plan view showing the main configuration of a date display mechanism in an electronic timepiece according to a first preferred embodiment of the present invention.

FIG. 1 is a plan view showing a date display mechanism 90 of an electronic timepiece 1 according to a first embodiment of the present embodiment. In FIG. 1, the main section of the date display mechanism 90 is primarily configured from a piezoelectric actuator 91, a rotor 92, a deceleration gear train, and a date wheel 93. The rotor 92 is preferable a drive object (driven member) rotatably driven by the piezoelectric actuator 91. The deceleration gear train decelerates and transmits the rotation of the rotor 92. The date wheel 93 is rotated by the drive force transmitted via the deceleration gear train. The deceleration gear train has a date turning intermediate wheel 94 and a date turning wheel 95. The piezoelectric actuator 91, the rotor 92, the date turning intermediate wheel 94, and the date turning wheel 95 are supported on a bottom plate 9A.

A disc-shaped dial (not shown) is provided at the top of the date display mechanism 90, and part of the outer peripheral surface of the dial is provided with a window to display the date, and is designed so that the date on the date wheel 93 is visible through the window. Also, a pointer movement gear train (not shown) connected to the stepping motor to drive the pointers, and a secondary battery 9B as a power source are provided to the bottom (reverse side) of the bottom plate 9A. The secondary battery 9B supplies power to the circuits of the stepping motor, the piezoelectric actuator 91, and a voltage application apparatus (not shown). The structure may also be such that a power generator that generates power by utilizing solar power or the rotation of an oscillating weight is connected to the secondary battery 9B, and the power generated by this power generator is charged to the secondary battery 9B. Also, the power source is not limited to a secondary battery 9B that is charged by a power generator, and may be a common primary battery (for example, a lithium ion battery).

The date turning intermediate wheel 94 is configured from a large wheel 941 and a small wheel 942. The small wheel 942 has a cylindrical shape somewhat smaller than the large wheel 941, and a notch 943 with a substantial square shape is formed in the outer peripheral surface thereof. The small wheel 942 is fixed in place to have the same center as the large wheel 941. A gear 921 at the top of the rotor 92 meshes with the large wheel 941. Therefore, the date turning intermediate wheel 94 composed of the large wheel 941 and small wheel 942 rotates in conjunction with the rotation of the rotor 92.

A plate spring 944 is provided on the bottom plate 9A on the side of the date turning intermediate wheel 94. The proximal end of the plate spring 944 is fixed in place on the bottom plate 9A, and the distal end is bent into a rough V shape. The distal end of the plate spring 944 is provided to be capable of going into and out of the notch 943 of the date turning intermediate wheel 94. A contact element 945 is disposed at a position near the plate spring 944. This contact element 945 is designed to come into contact with the plate spring 944 when the date turning intermediate wheel 94 rotates and the distal end of the plate spring 944 goes into the notch 943. A specific voltage is applied to the plate spring 944, and when the plate spring comes into contact with the contact element 945, this voltage is applied to the contact element 945 as well. Therefore, the state in which the date wheel is turned can be determined by determining the voltage of the contact element 945, and the amount that the date wheel 93 rotates in one day can be determined.

Determining the amount that the date wheel 93 rotates is not limited to using the plate spring 944 or the contact element 945, and it is possible to use devices for which the rotating state of the rotor 92 or the date turning intermediate wheel 94 is determined and a specific pulse signal is outputted. Specifically, it is possible to use a conventional photoreflector, photointerrupter, MR sensor, or other such rotation encoder or the like.

The date wheel 93 has a ring shape, and an inner gear 931 is formed on the inner peripheral surface thereof. The date turning wheel 95 has a gear with five teeth and meshes with the inner gear 931 of the date wheel 93. Also, a shaft 951 is provided in the center of the date turning wheel 95, and this shaft 951 is inserted into a through-hole 9C formed in the bottom plate 9A. The through-hole 9C is formed extending along the peripheral direction of the date wheel 93. The date turning wheel 95 and the shaft 951 are arranged upward and to the right in FIG. 1 by a plate spring 952 fixed on the bottom plate 9A. The date wheel 93 is also prevented from oscillating by the urging action of the plate spring 952.

Figure 2:
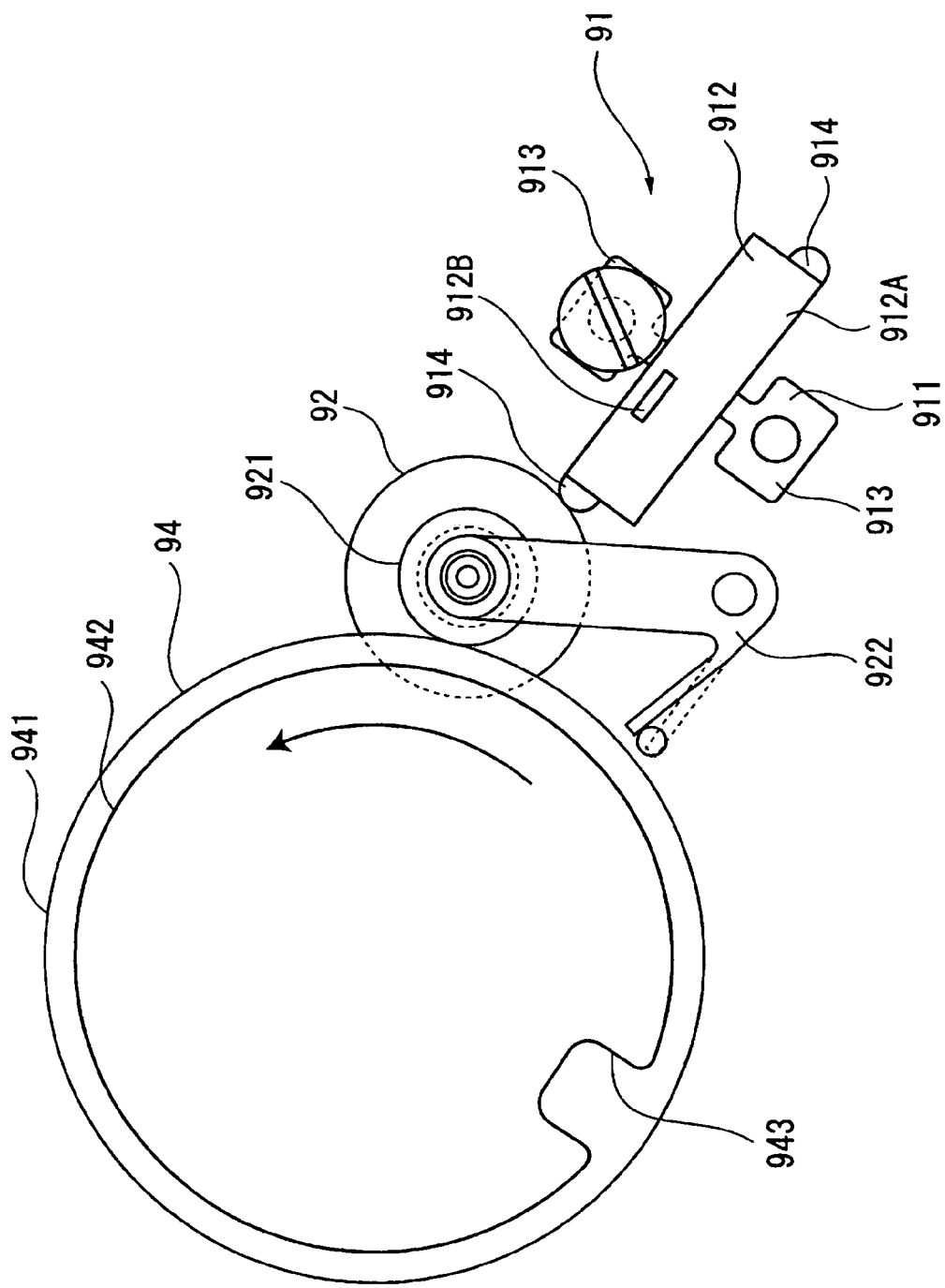
FIG. 2 is a plan view showing a piezoelectric actuator used in the electronic timepiece.

FIG. 2 shows an enlarged view of the piezoelectric actuator 91 and the rotor 92. As shown in FIG. 2, the piezoelectric actuator 91 has a substantially rectangular reinforcing plate 911, and a piezoelectric element 912 bonded to both sides of the reinforcing plate 911 to interpose it.

Arm sections 913 that protrude from both sides are formed near the center of the reinforcing plate 911 in the longitudinal direction. Further, one of these arm sections 913 is fixed in place on the bottom plate 9A by a screw or the like. The other arm section 913 is not fixed to the bottom plate 9A, but remains in a free state and constitutes a weight that provides oscillation balance when the piezoelectric actuator 91 oscillates.

Substantially hemispherical convexities 914 that protrude along the longitudinal direction of the reinforcing plate 911 are formed at both ends of the diagonal of the reinforcing plate 911. One of these convexities 914 comes in contact with the side of the rotor 92.

The piezoelectric element 912 is formed into a substantially rectangular shape, and is bonded to the substantially rectangular sections on both sides of the reinforcing plate 911. Electrodes are formed from a plating layer on both sides of the piezoelectric element 912. A substantially rectangular determination electrode 912B is formed in the surface of the piezoelectric element 912 by insulating the plating layer with a groove. This determination electrode 912B is formed toward the rotor 92 away from the longitudinal center of the piezoelectric element 912, and toward a convexities 914 away from the transverse center of the piezoelectric element 912. The area other than the determination electrode 912B constitutes a drive electrode 912A. The surface area of the determination electrode 912B is set to $1/30$th or more and $1/7$th or less of the surface area of the drive electrode 912A, and is more preferably set to $1/15$th or more and $1/10$th or less.

When a voltage with a specific frequency is applied to the drive electrode 912A of the piezoelectric actuator 91, oscillation is created in a longitudinal primary oscillation mode in which the piezoelectric element 912 is elongated along the longitudinal direction. At this time, since the convexities 914 are provided to both ends of the diagonal of the piezoelectric actuator 91, the piezoelectric actuator 91 as a whole is unbalanced in weight in relation to the middle line in the longitudinal direction. As a result of this imbalance, oscillation is created in a secondary bending oscillation mode in which the piezoelectric actuator 91 bends in a direction substantially perpendicular to the longitudinal direction. Therefore, the piezoelectric actuator 91 creates oscillation that combines the longitudinal primary oscillation mode and the secondary bending oscillation mode, and the convexities 914 describe a roughly elliptical arc. At this time, since the piezoelectric actuator 91 is fixed to only one of the arm sections 913 and the convexities 914 are provided at the ends of the diagonal and bear the reactive force from the rotor 92, the node of oscillation in the longitudinal primary oscillation mode and the node of oscillation in the secondary bending oscillation mode are out of alignment with the center of the piezoelectric element 912. In other words, the determination electrode 912B is formed at a position in the piezoelectric actuator 91 that includes the node of oscillation in the longitudinal primary oscillation mode and the node of oscillation in the secondary bending oscillation mode. Therefore, in the present embodiment, the vibrating body is configured from the reinforcing plate 911 and the piezoelectric element 912, and the contact section is configured from the convexities 914.

The drive electrode 912A, the determination electrode 912B, and the reinforcing plate 911 are all connected to the drive apparatus (voltage application apparatus) (not shown) by a lead wire or the like. The specific configuration of the drive apparatus is described later.

A plate spring 922 is mounted on the rotor 92, and the rotor 92 is urged towards the piezoelectric actuator 91. An appropriate frictional force is thereby created between the convexities 914 and the side of the rotor 92, resulting in satisfactory efficiency in transmitting the drive force of the piezoelectric actuator 91.

In such a timepiece 1, the piezoelectric actuator 91 creates oscillation combining the longitudinal primary oscillation mode and the secondary bending oscillation mode when a drive signal with a specific frequency is applied due to the fact that the drive apparatus controls the drive signal for the piezoelectric actuator 91. The convexities 914 oscillate while describing a roughly elliptical arc that combines these oscillation modes, and the rotor 92 is pressed upon in part of this oscillation arc, whereby the rotor 92 is rotatably driven.

Referring now to FIGS. 1 and 2, the rotational movement of the rotor 92 is transmitted to the date turning intermediate wheel 94. Further, when the teeth of the date turning wheel 95 mesh with the notch 943, the date turning wheel 95 is rotated by the date turning intermediate wheel 94, and the date wheel 93 is rotated. The date displayed by the date wheel 93 is changed as a result of this rotation.

2. Drive Apparatus and Drive Method for Piezoelectric Actuator

Next, the configuration of the drive apparatus 50 of the piezoelectric actuator 91 will be described with reference to FIG. 3.

Figure 3:
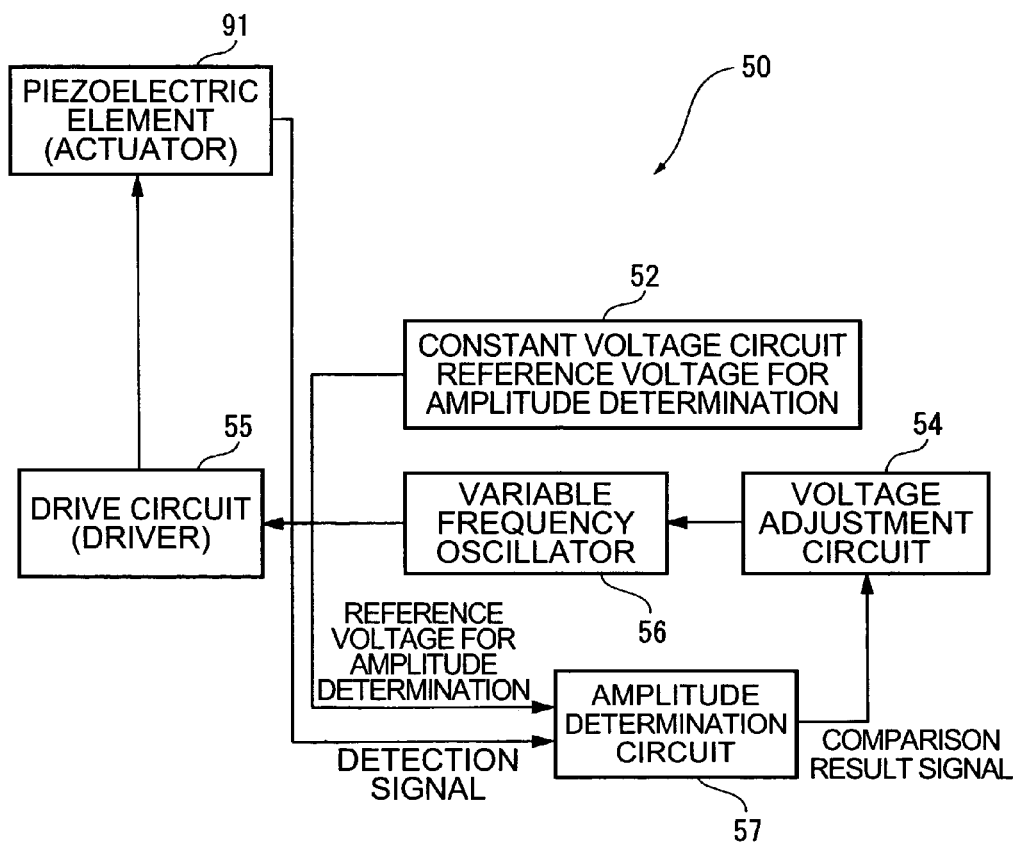
FIG. 3 is a view of a block diagram showing the internal configuration of a drive apparatus for the piezoelectric actuator.

In FIG. 3, the drive apparatus 50 has a constant voltage circuit 52, an amplitude determination circuit 57, a voltage adjustment circuit 54, and a variable frequency oscillator (VCP) 56. The drive circuit 55 to outputs a drive signal to the piezoelectric element 912 of the piezoelectric actuator 91. The constant voltage circuit 52 outputs a reference voltage for electric current determination. The amplitude determination circuit 57 compares the reference voltage for amplitude detection outputted by the constant voltage circuit 52 and the amplitude of the detection signal outputted by the piezoelectric actuator 91. the amplitude determination circuit also outputs the comparison result signal. The voltage adjustment circuit 54 adjusts the output voltage on the basis of the comparison result signal in the amplitude determination circuit 57. The variable frequency oscillator (VCO) 56 adjusts the frequency of the signal outputted to the drive circuit 55 according to the voltage outputted by the voltage adjustment circuit 54. The drive circuit 55 presents the piezoelectric element 912a with a drive signal correlated with the frequency of the signal inputted from the variable frequency oscillator 56.

In the present embodiment, a drive control unit to control the frequency of the drive signal supplied to the piezoelectric actuator 91 is configured using the drive circuit 55, the variable frequency oscillator 56, and the voltage adjustment circuit 54. The frequency control device is configured using the drive control unit, the constant voltage circuit 52, and the amplitude determination circuit 57.

The amplitude determination circuit 57 is set to output an H level comparison result signal when the amplitude of the detection signal is equal to or greater than the reference voltage for amplitude determination, and to output an L level comparison result signal when the amplitude of the detection signal is less than the reference voltage for amplitude determination.

Referring now to FIGS. 2 and 3, the detection signal outputted from the piezoelectric element 912 that is utilized is the signal outputted from the determination electrode 912B of the piezoelectric element 912.

The voltage adjustment circuit 54 is configured to vary the output voltage within a specific range, and to switch the adjustment speed (variation speed) on the basis of the comparison result signal in the amplitude determination circuit 57. One example of the configuration of the voltage adjustment circuit 54 is shown in FIG. 4.

Figure 4:
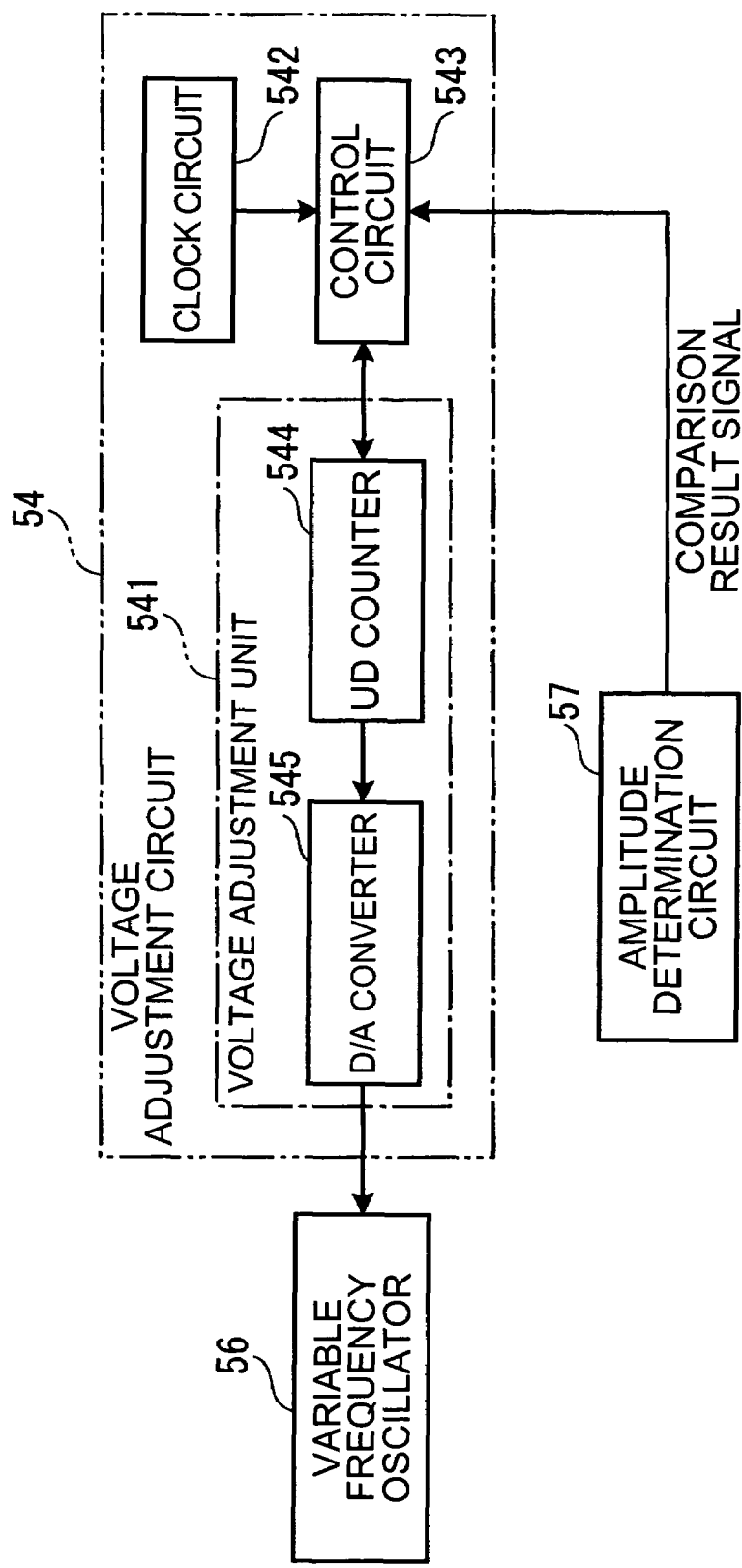
FIG. 4 is a view of a block diagram showing the internal configuration of a voltage adjustment circuit of the drive apparatus.

As seen in FIG. 4, the voltage adjustment circuit 54 has a voltage adjustment unit 541, a clock circuit 542, and a control circuit 543. The voltage adjustment unit 541 adjusts the voltage outputted to the variable frequency oscillator 56. The clock circuit 542 is a standard signal oscillator capable of outputting clock signals (standard signals) with a plurality of frequencies. The control circuit 543 outputs a signal to the voltage adjustment unit 541 according to the clock signals outputted by the clock circuit 542.

The voltage adjustment unit 541 has an up/down counter (UD counter) 544 and a digital/analog converter (D/A converter) 545 to convert digital signals outputted from the UD counter 544 into analog signals.

The control circuit 543 controls the counter value of the UD counter 544 so that the value varies within a preset range. This variation pattern may be set in advance, or may be selected from a plurality of patterns registered in advance according to the drive state and other attributes of the piezoelectric element 912. Possible suitable examples of this variation pattern include: a down pattern wherein the counter value of the UD counter 544 is sequentially counted down from the maximum value to the minimum value, and returns again to the maximum value upon reaching the minimum value; an up pattern wherein the counter value of the UD counter 544 is sequentially counted up from the minimum value to the maximum value, and returns again to the minimum value upon reaching the maximum value; and a two-way pattern wherein the counter value of the UD counter 544 is counted down from the maximum value to the minimum value, then is counted up to the maximum value upon reaching the minimum value, and then is counted back down to the minimum value upon reaching the maximum value.

Furthermore, the control circuit 543 is configured to switch the counting speed (speed of change of the counter value) of the UD counter 544 according to the comparison result signal inputted from the amplitude determination circuit 57. For example, the control circuit 543 utilizes a slow signal (for example, 100 kHz) from among the clock signals outputted from the clock circuit 542 to change the counter value of the UD counter 544 if the comparison result signal is at the H level, and utilizes a fast clock signal (for example, 1 MHz) to change the counter value if the comparison result signal is at the L level. The speed of change of the counter value of the UD counter 544 is thereby switched.

For the UD counter 544, a counter of about 10 bits or 12 bits can be used to input a pulse signal from the control circuit 543 to the down input or the up input of the UD counter 544, whereby the signal is counted and the counter value is changed. The bit number of the UD counter 544 may be selected according to the sweep frequency band. Specifically, when the resolution (the change in frequency when the counter value changes by 1) is about 0.01 to 0.25 kHz and the sweep frequency band is about 50 to 100 kHz, a counter of about 10 to 12 bits must be used, but if the sweep frequency band is smaller, then a counter with a smaller bit number can be used; for example, a counter of 8 or 9 bits.

In the D/A converter 545, a frequency control voltage value is set according to the counter value of the UD counter 544. The D/A converter 545 presents the variable frequency oscillator 56 with a frequency control voltage corresponding to this frequency control voltage value in accordance with the counter value when the counter value outputted from the UD counter 544 is inputted.

The variable frequency oscillator 56 outputs a frequency signal according to the voltage outputted from the D/A converter 545 to the drive circuit 55, and the drive circuit 55 outputs a drive signal with a frequency correlated with the frequency of the inputted signal to the piezoelectric element 912. Therefore, the frequency of the drive signal is set according to the counter value of the UD counter 544, and the frequency sweep speed of the drive signal is set by the speed of change of the counter value of the UD counter 544, that is, by the frequency of the clock signal used by the control circuit 543.

Therefore, as seen in FIG. 3, the voltage adjustment circuit 54 has a frequency sweep (change) control function to sweep (change) the frequency of the drive signal supplied to the piezoelectric element 912 via the variable frequency oscillator 56 and the drive circuit 55, and a sweeping frequency speed control function to control the sweep speed of the drive signal frequency on the basis of the comparison result signal outputted from the amplitude determination circuit 57. Therefore, among the frequency control devices in the present embodiment, the frequency variation control device to control the frequency variation of the drive signal and the sweep frequency variation speed control device to control the variation speed (sweep speed) of the drive signal frequency are configured primarily from the voltage adjustment circuit 54.

Next, the drive method of a piezoelectric actuator that uses the drive apparatus 50 will be described with reference to FIGS. 5 through 7.

Figure 5:
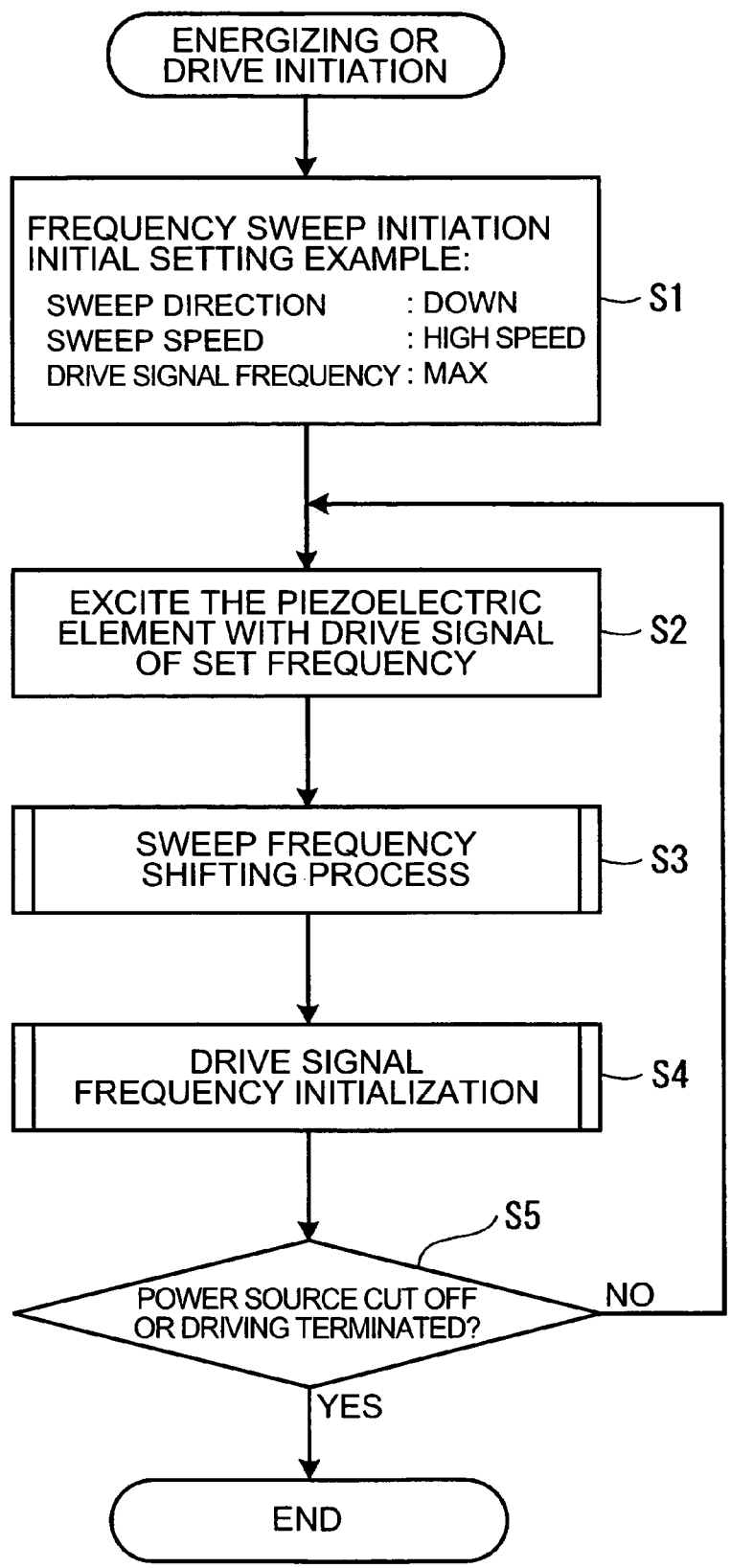
FIG. 5 is a view of a flow chart describing a method of driving the piezoelectric actuator in the present embodiment.

As shown in FIG. 5, when an instruction is issued to energize the drive apparatus 50 or to initiate driving, the drive apparatus 50 initiates a frequency sweep for the drive signal outputted to the piezoelectric element 912 (step 1, hereinafter the steps are abbreviated as "S").

In the present embodiment, the direction of the frequency sweep, the speed, and the drive signal frequency at drive initiation are set in advance by the voltage adjustment circuit 54. For example, the sweep direction is set to DOWN (the direction in which the frequency of the drive signal is lowered), the sweep speed is set to a high speed (A×10 kHz/sec), and the drive signal frequency at drive initiation is set to MAX. Therefore, the frequency of the drive signal is sequentially reduced from the MAX value of the frequency range according to the sweep speed.

The frequency control of this drive signal is performed as follows. Specifically, referring to FIGS. 4 and 5, the control circuit 543 sets the counter value of the UD counter 544 to a value corresponding to the drive signal frequency fmax, and then inputs a pulse signal to the down input of the UD counter 544 and counts down the counter value of the UD counter 544 on the basis of the clock signals from the clock circuit 542.

Since a voltage according to the counter value of the UD counter 544 is outputted from the D/A converter 545, the voltage outputted from the D/A converter 545 is reduced if the counter value of the UD counter 544 is reduced.

A signal with a frequency corresponding to the voltage value is then outputted from the variable frequency oscillator 56, and a drive signal corresponding to this frequency is outputted from the drive circuit 55 to drive (excite) the piezoelectric element 912 (S2).

When the piezoelectric element 912 is driven, the amplitude determination circuit 57 and the voltage adjustment circuit 54 perform a sweep speed switch based on the detection signal outputted from the determination electrode 912B of the piezoelectric element 912 (S3).

Figure 6:
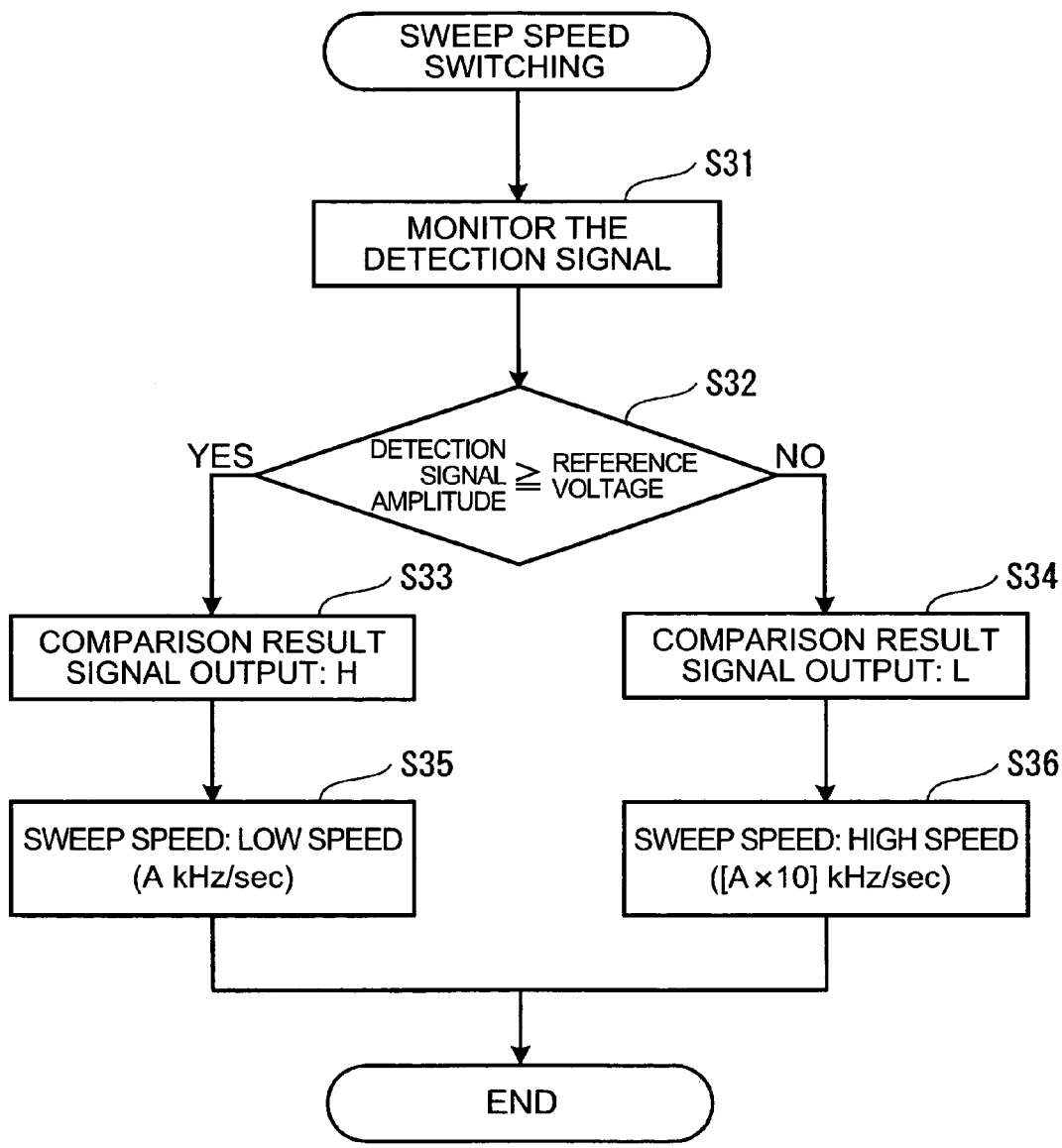
FIG. 6 is a view of a flow chart describing a sweep speed switching method shown in the flow chart in FIG. 5.

In the sweep speed switch (S3), as shown in FIGS. 3 and 6, the amplitude determination circuit 57 monitors the detection signal outputted from the piezoelectric element 912 (S31) and compares the amplitude (voltage) of the detection signal with the reference voltage for amplitude determination outputted from the constant voltage circuit 52 (S32).

In S32, the amplitude determination circuit 57 (frequency change control device) outputs an H level comparison result signal if the detection signal amplitude is equal to or greater than the reference voltage (S33). Conversely, the amplitude determination circuit 57 outputs an L level comparison result signal if the detection signal amplitude is less than the reference voltage (S34).

The voltage adjustment circuit 54 (frequency change speed control device) sets the sweep speed to a low speed upon receiving an H level comparison result signal (S35). Specifically, this state is maintained when the sweep speed is set to a low speed, and the speed is switched to a low speed when the setting is on a high speed.

Further, the voltage adjustment circuit 54 sets the sweep speed to a high speed if an L level comparison result signal was received (S36). Specifically, this state is maintained when the sweep speed is set to a high speed, and the speed is switched to a high speed when the setting is on a low speed.

In the present embodiment, as shown in FIG. 6, the low-speed sweeping is A kHz/sec, and the high-speed sweeping is equal to 10 times the low speed, or A×10 kHz/sec. A may be "10," for example, and is set accordingly.

Thus, in the sweep speed switch S3 of the present embodiment, the sweep speed is switched between two speeds, a high speed and a low speed.

When the sweep frequency shifting process S3 is complete, drive signal frequency initialization S4 is performed as shown in FIG. 5.

Figure 7:
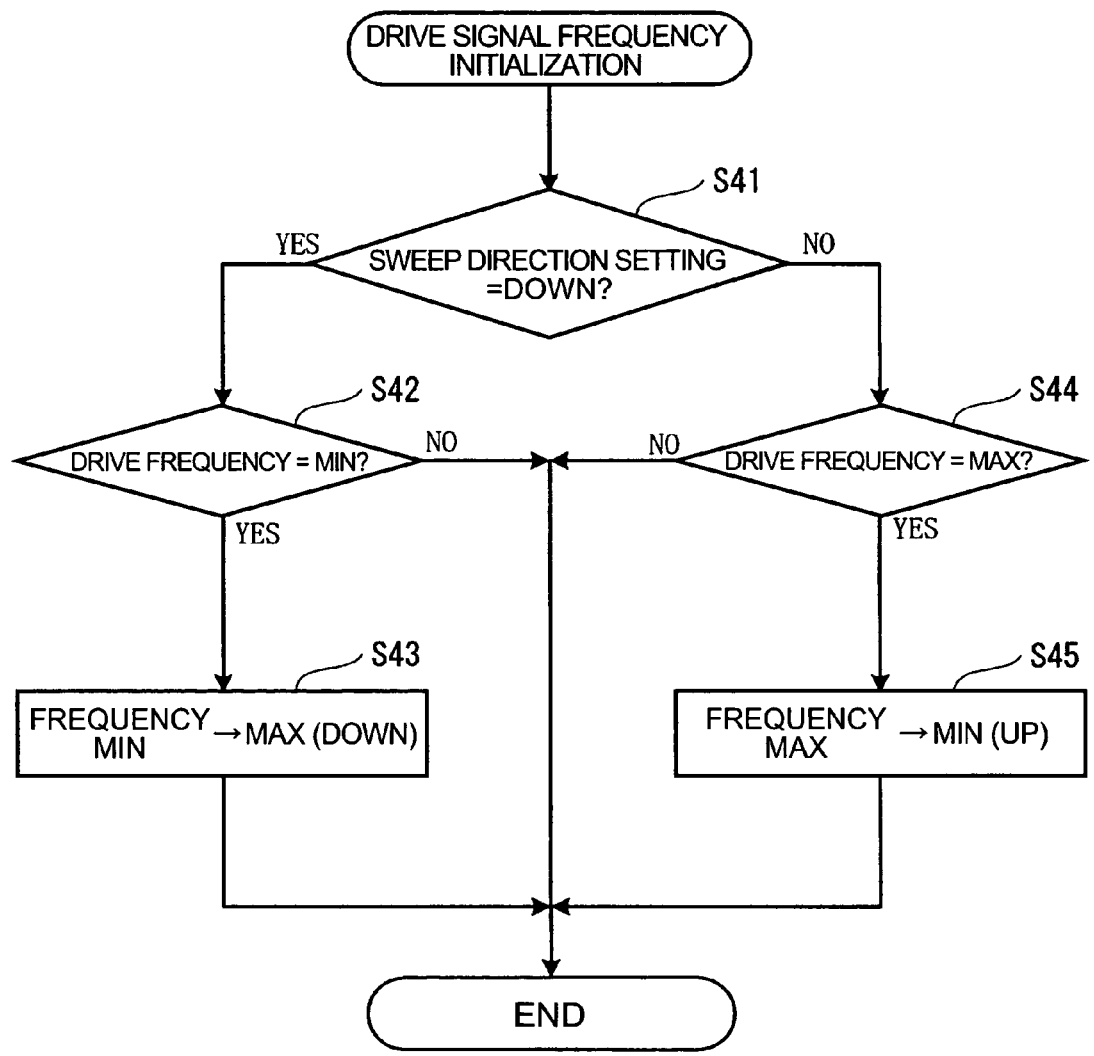
FIG. 7 is a view of a flow chart describing a drive signal frequency initialization method shown in the flow chart in FIG. 5.

Referring now to FIGS. 4 and 7, in the drive signal frequency initialization S4 as shown in detail in FIG. 7, the control circuit 543 of the voltage adjustment circuit 54 confirms the setting of the sweep direction (S41). If the sweep direction is DOWN, the control circuit 543 determines whether the drive frequency is at the minimum value (MIN) of a specific frequency range (S42). Specifically, the frequency of the drive signal corresponds to the counter value of the UD counter 544, and therefore the control circuit 543 confirms the counter value of the UD counter 544 and determines whether the drive frequency is at the minimum value.

If the sweep direction is DOWN and the drive frequency is at the minimum value, the control circuit 543 changes the drive frequency to the maximum value (S43). Specifically, the control circuit 543 changes the counter value of the UD counter 544 to a counter value corresponding to the maximum value of the drive frequency.

Also, in S42, if the drive frequency has not reached the minimum value, the drive signal frequency initialization S4 is completed without performing the initialization process on the frequency.

In the present embodiment, the sweep direction was set to DOWN, but if it is set to UP, the determination in S41 is "No," and therefore the control circuit 543 determines whether the drive frequency is at the maximum value (MAX) of a specific frequency range (S44). Specifically, the control circuit 543 confirms the counter value of the UD counter 544 to determine whether the drive frequency is at the maximum value.

If the sweep direction is UP and the drive frequency is at the maximum value, the control circuit 543 changes the drive frequency to the minimum value (MIN) (S45). Specifically, the control circuit 543 changes the counter value of the UD counter 544 to a counter value corresponding to the minimum value of the drive frequency.

Also, in S44, if the drive frequency has not reached the maximum value, the drive signal frequency initialization S4 is completed without performing the initialization process on the frequency.

Referring to FIG. 5, when the drive signal frequency initialization S4 is complete, it is determined whether an instruction has been issued to turn off the power or to terminate the driving (S5). If the determination is "No" in S5, the processes in S2 through S4 are repeated. If the determination is "Yes" in S5, drive control is then completed.

Figure 8:
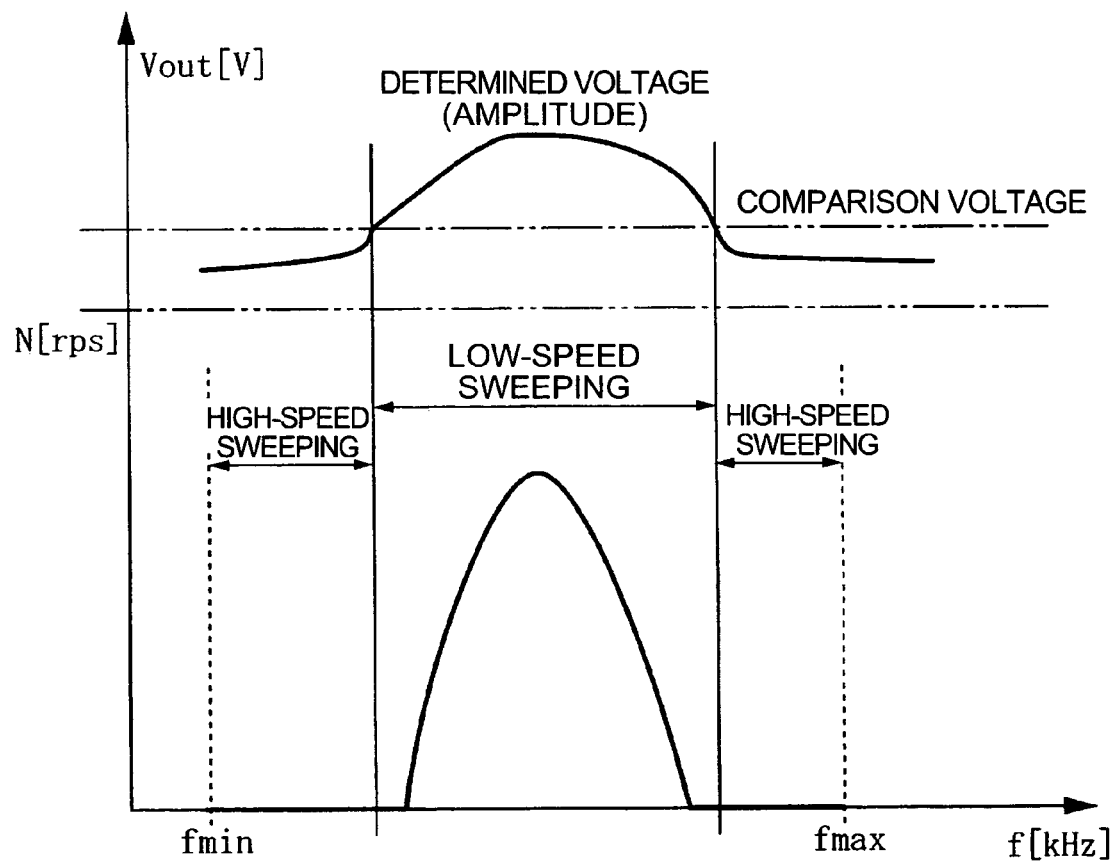
FIG. 8 is view of a graph showing the relationship between the frequency of a drive signal and the rotational frequency of a driven object of a electronic timepiece of the present embodiment.

FIG. 8 shows the relationship between the rotational frequency (rps) of the driven member when such control is performed, and the frequency of the drive signal.

The frequency of the drive signal is swept in the DOWN direction from fmax to fmin. The frequency range in which the piezoelectric element 912 is excited (driven) fluctuates according to the surrounding temperature and the load of the driven member and the like. When the piezoelectric element 912 is excited or driven, the amplitude of the detection signal (determination voltage) increases. Therefore, it is possible to determine whether or not the vibration of the piezoelectric actuator 91 reaches a level of vibration capable of driving the rotor 92, which is the driven object, according to whether or not the determination voltage is equal to or greater than the comparison voltage (reference voltage for amplitude determination).

Therefore, as previously described, when the determination voltage is less than the comparison voltage (reference voltage for amplitude determination), that is, when it is determined that the rotor 92 is not driven, the sweep speed is set to a high speed. Further, when the reference voltage is more than the comparison voltage (reference voltage for amplitude determination), that is, when it is determined that the rotor 92 is driven, the sweep speed is set to a low speed.

In the example in FIG. 8, the rotor 92 does not rotate at or near the point where the determination voltage is changed from less than the comparison voltage to equal to or greater than the comparison voltage. However, even in such cases, the frequency of the drive signal draws near the frequency range in which the rotor 92 is driven, and therefore the rotor 92 can begin driving after a short time if the drive signal is then inputted. Specifically, the comparison voltage may be set to a value at which the rotor 92 is reliably driven, and as shown in FIG. 8, the frequency of the drive signal may be set to a value which is near the frequency range for driving the rotor 92 and at which driving begins promptly. If so, sweeping can always be controlled at a low speed in the frequency range in which the rotor 92 is driven.

3. Effects of the Embodiment

Therefore, according to the present embodiment, the following effects can be achieved.

(1) The drive apparatus 50 of the piezoelectric actuator of the present embodiment sweeps the drive signal to drive the piezoelectric element 912 within a specific frequency range, and reliable driving can be ensured as long as the piezoelectric element 912 can be driven within this frequency range. Consequently, if an ultrasonic motor that uses the piezoelectric element 912 is used, the driven member can be reliably rotated.

(2) Also, since the drive signal is normally swept within a specific frequency range, even if the drive frequency of the piezoelectric element 912 is nonuniform due to fluctuations in the surrounding temperature, noise interference, and the load, it is possible to overcome such nonuniformities without performing adjustments. Therefore, there is no need to provide the drive apparatus 50 with a determination circuit for determining fluctuations in the surrounding temperature, noise interference, and the load, nor is it necessary to provide an adjustment circuit for adjusting the frequency of the drive signal on the basis of such determination data, and the configuration of the drive apparatus 50 can be simplified.

(3) Furthermore, the amplitude of the detection signal from the piezoelectric element 912 is compared with a reference voltage for amplitude determination to determine the drive state of the rotor 92, and when the detected amplitude is equal to or greater than the reference voltage, that is, when the rotor 92 is driven, the sweep speed is set to a low speed, and when the detected amplitude is less than the reference voltage, that is, when the rotor 92 is in a non-drive state, the sweep speed is set to a high speed. Therefore, for example, the time during which the rotor 92 is driven can be lengthened and the time of the non-drive state can be shortened during the time required to perform a single sweep cycle in which the frequency is swept from fmax to fmin. Thus, since needless drive signal output time during which the rotor 92 cannot be driven can be shortened, needless power consumption can be curtailed and efficiency can be increased. Also, since the time of the non-drive state can be shortened, nonuniformities in the drive time during a specific time of one minute, for example, can be reduced even if fluctuations in the load or the like occur, discrepancies (nonuniformities) in the rotational speed of the rotor 92 rotatably driven by the piezoelectric element 912 can be reduced, and high speed driving is also made possible.

(4) In the present embodiment, the amplitude of the detection signal is compared with a reference voltage in the amplitude determination circuit 57, and the frequency sweep speed of the drive signal is switched between two levels of high and low on the basis of the comparison result signal in the voltage adjustment circuit 54, and the circuit configuration of the drive apparatus 50 can therefore be simplified and the control process can be performed simply.

(5) Since the voltage adjustment circuit 54 is configured using the clock circuit 542, the control circuit 543, the UD counter 544, and the D/A converter 545, the frequency speed varying process can be controlled merely by the frequency of the clock signal outputted form the clock circuit 542, and the range of speed variation can therefore be increased and the sweep speed can be easily adjusted among a plurality of levels.

Also, since the voltage adjustment unit 541 is configured using the UD counter 544, there is no need for externally mounted components, and the sweep speed can be easily varied, making it possible to fashion the components into an integrated circuit.

(6) The electronic timepiece is configured from a piezoelectric actuator 91 having a vibrating body with a piezoelectric element 912, and also having a convexity 914 provided on this vibrating body and pressed against the drive object; a drive apparatus 50 with the above-described configuration; and a date display mechanism 90 driven by the piezoelectric actuator 91. Therefore, it is possible to provide an electronic timepiece in which it is possible to achieve stable drive control in a short amount of time with a low power consumption.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Next, the configuration of the drive apparatus 50A for the piezoelectric actuator 91 in accordance with a second preferred embodiment of the present invention will be described with reference to FIGS. 9 and 10.

Figure 9:
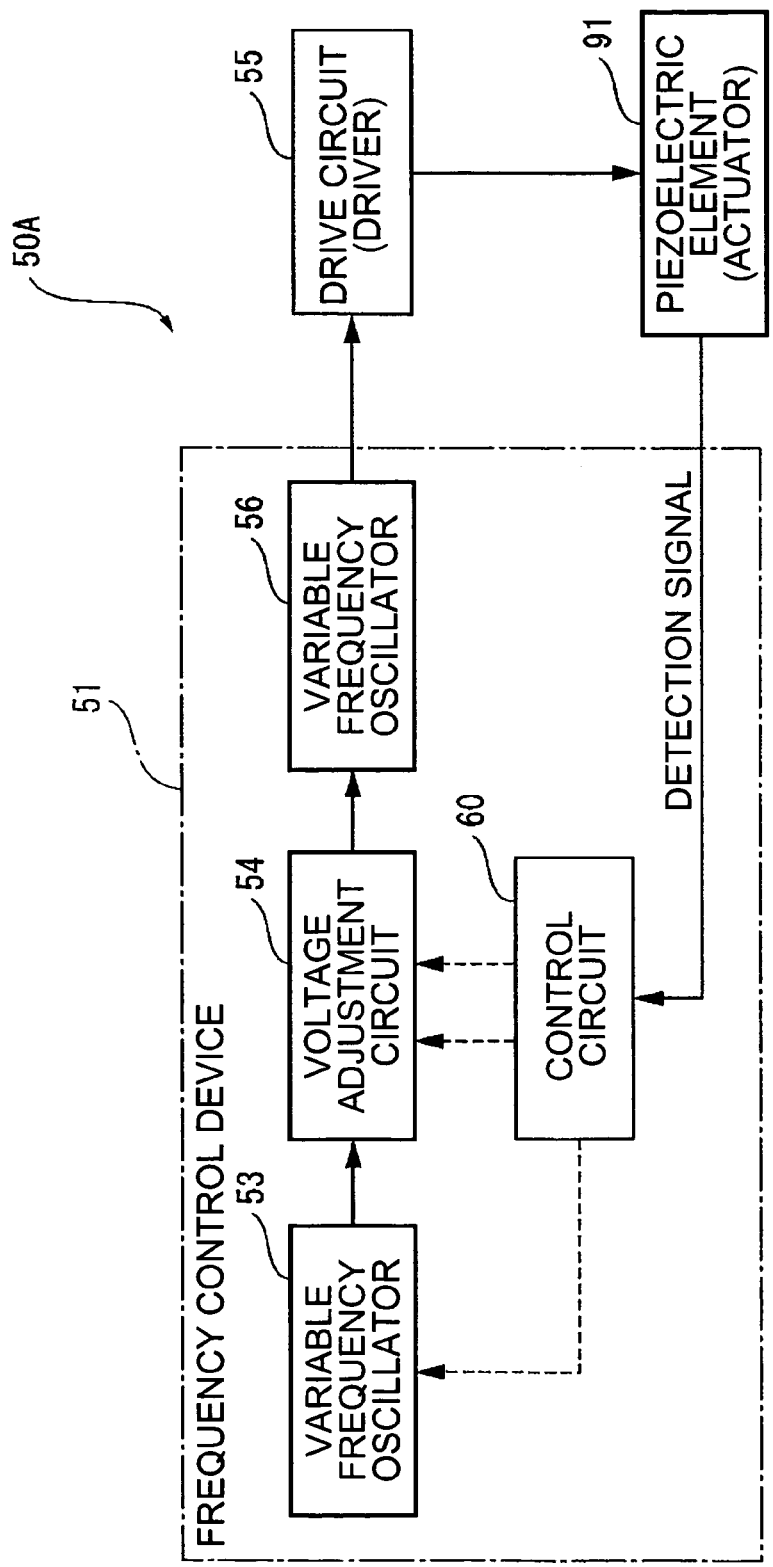
FIG. 9 is a view of a graph showing the internal configuration of a drive apparatus for a piezoelectric actuator of a second preferred embodiment of the present invention.

In FIG. 9, the drive apparatus 50A has a drive circuit 55 to output a drive signal to the piezoelectric element 912 of the piezoelectric actuator 91, and a frequency control device 51 to control the frequency of the drive signal outputted from the drive circuit 55.

Figure 10:
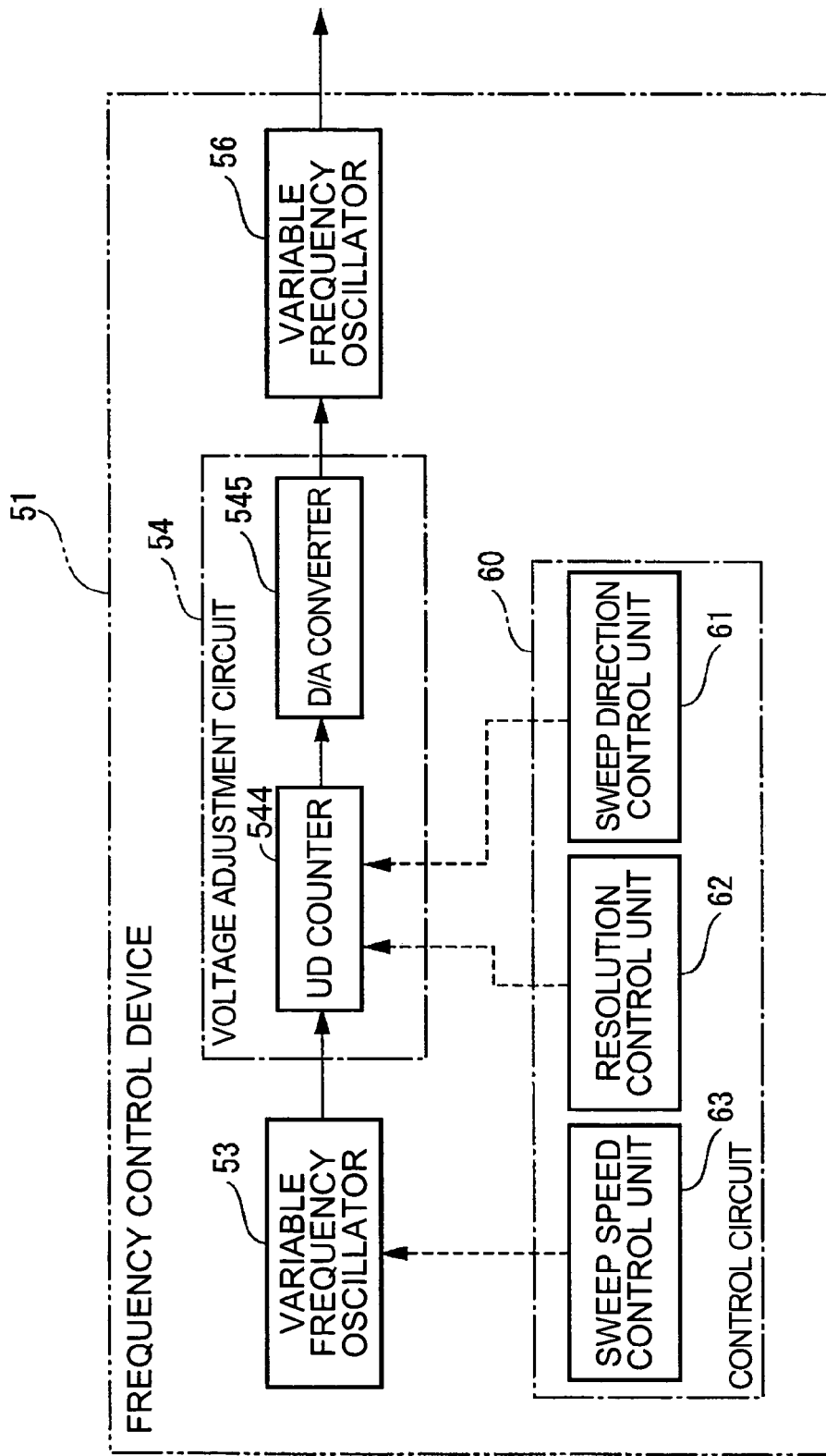
FIG. 10 is a view of a graph showing the internal configuration of a frequency control device of the drive apparatus of the second embodiment.

The frequency control device 51 is configured from a first variable frequency oscillator 53, a voltage adjustment circuit 54, a second variable frequency oscillator 56, and a control circuit 60, as shown in FIG. 10.

The voltage adjustment circuit 54 is configured from a UD counter 544 and a D/A converter 545. The control circuit 60 is configured from a sweep direction control unit 61, a frequency resolution control unit 62, and a sweep speed control unit 63.

The first variable frequency oscillator 53 outputs a clock signal with a specific frequency to the voltage adjustment circuit 54. The frequency of the clock signal outputted from the first variable frequency oscillator 53 is controlled by the sweep speed control unit 63 of the control circuit 60. The first variable frequency oscillator 53 of the present embodiment is adapted to be capable of outputting three clock signals preferably with frequencies of 100 kHz, 500 kHz, and 1 MHz, and the clock signal with the frequency selected by the sweep speed control unit 63 is outputted.

The voltage adjustment circuit 54 increases the output voltage within a specific range, and is configured to switch the variation direction of the voltage and the variation speed on the basis of instructions from the control circuit 60. One example of the configuration of the voltage adjustment circuit 54 is shown in FIG. 10.

The voltage adjustment circuit 54 includes an up-down counter (UD counter) 544, and a digital/analog converter (D/A converter) 545 that converts a digital signal outputted from the UD counter 544 to an analog signal.

In the D/A converter 545, a frequency control voltage value is set according to the counter value of the UD counter 544. The D/A converter 545 presents the variable frequency oscillator 56 with a frequency control voltage corresponding to this frequency control voltage value in accordance with the counter value when the counter value outputted from the UD counter 544 is inputted.

The variable frequency oscillator 56 outputs a frequency signal according to the voltage outputted from the D/A converter 545 to the drive circuit 55, and the drive circuit 55 outputs a drive signal with a frequency correlated with the frequency of the inputted signal to the piezoelectric element 912.

Therefore, the frequency of the drive signal is set according to the counter value of the UD counter 544. The frequency sweep speed of the drive signal is herein set by the speed of change of the counter value of the UD counter 544. Also, the sweep speed of the drive signal frequency is set according to the speed of change of the counter value of the UD counter 544, that is, the frequency of the clock signal outputted from the first variable frequency oscillator 53. Furthermore, the frequency resolution of the drive signal is set according to the bit number of the UD counter 544.

The UD counter 544 counts the clock signal inputted from the first variable frequency oscillator 53, and outputs the counted value to the D/A converter 545. The UD counter 544 is provided with a down input unit to input a clock signal when the counter value is reduced, and an up input unit to input a clock signal when the counter value is increased. The sweep direction control unit 61 of the control circuit 60 selects the input unit to which the clock signal from the first variable frequency oscillator 53 is to be inputted.

Specifically, when the sweep direction control unit 61 controls the sweep direction in the down direction, the control is such that the initial value of the counter value of the UD counter 544 is set to the maximum value, and the clock signal from the first variable frequency oscillator 53 is inputted to the down input unit.

Also, when the sweep direction control unit 61 controls the sweep direction in the up direction, the control is such that the initial value of the counter value of the UD counter 544 is set to the minimum value, and the clock signal from the first variable frequency oscillator 53 is inputted to the up input unit.

Further, the bit number of the UD counter 544 is set by the frequency resolution control unit 62 of the control circuit 60. The present embodiment is configured so that 10 bits (low resolution) and 12 bits (high resolution) can be selected.

The bit number that can be selected in the UD counter 544 is not limited to 10 and 12 bits, and may be selected according to the frequency range to be swept and the like. Specifically, when the resolution (amount by which the frequency changes when the counter value changes by 1) is about 0.01 to 0.25 kHz and the swept frequency range is about 50 to 100 kHz, a counter of about 10 to 12 bits must be used, but if the swept frequency range is smaller, a counter with a smaller bit number, for example, a counter that can be selected with 8 or 9 bits, can be used.

Next, the drive method for the piezoelectric actuator 91 in the second embodiment will be described.

First, referring to FIGS. 1 and 10, the operator in the production line for the timepiece 1 measures the rotational speed of the rotor 92 that is rotatably driven by the piezoelectric actuator 91.

Then, if the rotational speed of the rotor 92 differs from a specific preset rotational speed due to individual differences in the piezoelectric actuator 91 or nonuniformities in the contact angle or pressure when the rotor 92 and the piezoelectric actuator 91 are incorporated into the timepiece 1, the operator may set the sweep direction, the sweep speed, and the frequency resolution via the control units 61 to 63 of the control circuit 60, and may adjust the rotational speed of the rotor 92.

Specifically, the operator uses the control units 61 to 63 to set the sweep direction, the frequency resolution, and the initial values of the sweep speed during high-speed sweeping and low-speed sweeping for each timepiece 1. The timepieces 1 initially set in this manner are controlled in terms of driving by the procedure shown in FIGS. 5 through 7 in the same manner as in the first embodiment. Specifically, when the power source is added, the drive apparatus 50A initiates frequency sweeping of the drive signal with the sweep direction, the frequency resolution, and the sweep speed (high speed) set by the control units 61~63 (S1). Then, the process in S2 through S5 is repeated to control the driving of the piezoelectric actuator 91. At this time, the specific speed value of the low speed set by the S35 is a value set in advance by the sweep speed control unit 63. Also, the specific speed value of the high speed set in S1 and S36 is set to a high speed that has been preset by the sweep speed control unit 63. For example, the high speed is set to 1 MHz/s, and the low speed is set to a speed selected in advance from 1 MHz/s, 500 kHz/s, and 100 kHz/s.

An example of the drive speeds set according to combinations of the sweep direction, the sweep speed, and the frequency resolution is shown in FIG. 11. The example in FIG. 11 is one in which the piezoelectric actuator is used for the date display mechanism of an electronic timepiece, and the ratio (multiplying factor) of the drive speed according to the combination of the sweep direction, the sweep speed, and the frequency resolution is shown for a case in which the settings are made such that the voltage is 3 V, the drive force is 7.5 g, and the drive frequency range in relation to the sweeping frequency range is 3 (sweeping range) to 1 (rotational range). Specifically, this example shows a case in which the sweeping frequency is 240 to 300 kHz, and the rotational range is approximately 260 to 280 kHz.

The sweep direction is set to either the down direction or the up direction, the sweep speed is adapted to be capable of switching between the three levels of 100 kHz/sec, 500 kHz/sec, and 1 MHz/sec, and the frequency resolution is adapted to be capable of switching between two levels of 12 bits and 10 bits. The drive speed when the sweep direction is DOWN, the low speed is 1 MHz/sec, and the frequency resolution is 12 bits is the standard speed (1.0), and speeds of other combinations are shown by the multiplying factor in relation to the standard speed.

As is clear from FIG. 11, the sweep direction has the strongest effect on adjusting the drive speed, and the sweep speed and frequency resolution have less of an effect in the order indicated.

The speed difference is large due to switching the sweep direction, and the drive speed widely fluctuates when other sweep speeds and frequency resolutions are set according to this direction setting. Therefore, when the speed is adjusted to the desired drive speed, the sweep direction is preferably set first.

With the sweep speed, the drive speed can be varied within the widest range, and the sweep speed can functionally adjusted with greater ease within a plurality of levels, for example, 3 to 6 levels, at the point where adjustment can be achieved merely by varying the frequency of the clock signal by means of the variable frequency oscillator 53. Therefore, the sweep speed is the most suitable for speed adjustment to adjust the speed to the desired drive speed.

In the example in FIG. 11, the frequency of the clock signal outputted from the variable frequency oscillator 53 preferably has a range of about 100 kHz to 1 MHz. In common practice, there is also a range in which the driven object cannot be driven during a single sweep cycle, making it obvious that the driven object (driven member) moves intermittently when the sweep speed is too low at 100 kHz/sec or less. Conversely, when the sweep speed is too high at 1 MHz/sec or greater, the sweep speed increases in comparison with a single drive signal pulse and the variation of the speed becomes saturated. Therefore, a range of about 100 kHz/sec to 1 MHz/sec is preferred.

The optimum range of the frequency of the clock signal, that is, the range in which the sweep speed is adjusted, is preferably set according to the resonance frequency of longitudinal oscillation and bending oscillation, which is set according to the size and the like of the piezoelectric actuator.

With the frequency resolution (bit number), the speed difference due to switching is relatively large, but the levels of the change in speed are limited to several levels. The drive speed improves with larger bit numbers, but the UD counter 544 is normally about 10 to 12 bits, which is less expensive.

Effects of Second Embodiment

According to the present embodiment, the following operating effects can be achieved.

(2-1) The drive apparatus 50A for the piezoelectric actuator 91 of the present embodiment can adjust the drive speed of the piezoelectric actuator 91 by appropriately switching the sweep direction, the sweep speed, and the frequency resolution of the drive signal frequency for driving the piezoelectric element 912. Therefore, nonuniformities in the drive speed due to individual differences or characteristic differences in the individual piezoelectric actuators 91 can be eliminated with a simple operation, and piezoelectric actuators 91 capable of driving a driven object at a specific speed can be manufactured and supplied in a stable manner.

Also, the drive speed of the piezoelectric actuator 91 can be adjusted in advance merely by appropriately setting the sweep direction, the sweep speed, and the frequency resolution in advance, so, unlike in conventional practice, there is no need for a speed adjustment mechanism wherein the drive speed of the piezoelectric actuator is determined and adjusted on a case by case basis, drive control is simplified, and costs can be reduced.

(2-2) In the present embodiment, the three parameters of the sweep direction (two directions), the sweep speed (three levels), and the frequency resolution (two levels) can be set in combinations, and the drive speed can therefore be adjusted among 12 levels and the drive speed can be adjusted precisely.

(2-3) The drive apparatus 50A for a piezoelectric actuator of the present invention sweeps the drive signal for driving the piezoelectric element 912 within a specific frequency range, and therefore the piezoelectric element 912 can be reliably driven as long as the element is driven within this frequency range. Therefore, an ultrasonic motor that uses the piezoelectric element 912 can reliably rotate a driven object.

(2-4) Also, since the drive signal is normally swept within a specific frequency range, even if the drive frequency of the piezoelectric element 912 is nonuniform due to fluctuations in the surrounding temperature, noise, load, and the like, such nonuniformities can be overcome without making any adjustments. Therefore, there is no need to provide the drive apparatus 50A with detection circuits for detecting fluctuations and the like in the surrounding temperature, noise, and the load, or an adjustment circuit for adjusting the frequency of the drive signal on the basis of such detected data, and the configuration of the drive apparatus 50A can be simplified.

(2-5) Since the voltage adjustment circuit 54 is configured from the UD counter 544 and the D/A converter 545, and changes in the sweep speed can be controlled by the frequency of the clock signal outputted from the variable frequency oscillator 53, the range of change in the speed can be expanded, and the sweep speed can be easily adjusted among a plurality of levels.

Also, since the frequency resolution can be set according to the bit number of the UD counter 544, the frequency resolution can also be easily switched.

(2-6) Since the electronic timepiece is configured from a piezoelectric actuator 91 that has a vibrating member with a piezoelectric element 912, and also has a convexity 914 that is provided to the vibrating member and that comes in contact with a driven object, as well as from a drive apparatus 50A with the configuration previously described, and a date display mechanism 90 that is driven by the piezoelectric actuator 91, it is possible to provide an electronic timepiece wherein stable drive control can be realized in a short time with low power consumption.

The present invention is not limited to the embodiments previously described, and also includes all modifications, improvements, and the like within a range in which the objects of the present invention can be achieved.

For example, in the embodiments, the driving of the piezoelectric element 912 was controlled by comparing the amplitude of the detection signal outputted from the piezoelectric element 912 with a reference voltage for amplitude determination. However, in the present invention, for example, resistance may also be provided to the driver to drive the piezoelectric actuator, and the process of switching the sweep speed of the drive signal frequency on the basis of the electric current value flowing through the piezoelectric actuator may be controlled by detecting the change in the electric current value flowing through the piezoelectric actuator as a voltage value.

Also, when a plurality of detection signals are detected, the frequency of the drive signal may be controlled by determining the amplitude of one detection signal previously selected, or the amplitude of each detection signal may be determined and stored at a specific time immediately after driving, and the frequency may be controlled based on the amplitude of the detection signal with the greatest change in amplitude. In this case, since the frequency can be controlled based on the detection signal with the greatest change in amplitude, the change can be reliably determined, which allows efficient controls to be performed.

Also, switching the sweep speed (high speed and low speed) based on the detection signal is not limited to switching between two levels as in the previous embodiments, and a configuration may be used wherein the sweep speed is switched between three, four, or more levels. When the sweep speed is switched, for example, a plurality of reference voltages may be outputted from the constant voltage circuit 52, and the frequency may be controlled by comparing the voltage of the detection signal with the reference voltages.

The sweeping pattern of the drive signal frequency is not limited to a down pattern as in the previous embodiments, wherein the frequency is swept from a specific maximum frequency fmax to a minimum frequency fmin and returns to the maximum frequency fmax when it reaches the minimum frequency fmin and is then swept back to the minimum frequency fmin, and other possibilities include an up pattern wherein the frequency is constantly swept from the minimum frequency fmin to the maximum frequency fmax, or a two-way pattern wherein the frequency is swept up to the maximum value upon reaching the minimum value, and is then swept down to the minimum value upon reaching the maximum value.

Another possibility is a configuration wherein these sweeping patterns are selected based on the drive state of the piezoelectric element 912.

Furthermore, in the previous embodiments, the sweep speed during the initial setting was set to a high speed, but it may also be set to a low speed. However, in most cases, the driven object is not driven at the frequency during the initial setting, and therefore the speed can be immediately switched to a high speed if it was set to a low speed. Therefore, control is more efficient if the initial setting is set to a high speed.

The drive apparatus 50 is not limited to one that uses a voltage adjustment circuit 54 having the UD counter 544, and may be one that has a voltage adjustment circuit in which a plurality of loop filters with different time constants are used, that is, the drive apparatus may be capable of sweeping the frequency of the drive signal outputted from the drive circuit 55 to the piezoelectric element 912, and may be capable of varying the sweep speed among a plurality of levels.

The specific configuration of the amplitude determination circuit 57 is not important as long as the circuit can determine the amplitude. The circuit may, for example, determine a specific number of amplitudes within a specific amount of time, or it may simply determine the amplitude level or determine the peak level of the amplitude.

Also, in the second embodiment, the present invention was used to remove in advance nonuniformities in the drive speed due to individual differences in the piezoelectric actuators, but the present invention may also be used during feedback control to adjust the speed by determining the drive speed while the driven member is being driven.

Also, for example, the present invention may be used to switch the speed of moving toys or the like when operation is enabled due to the user switching the drive speed between high speed driving and low speed driving.

In other words, the present invention is not limited to adjusting the speed to match it with the desired drive speed, and can also be utilized to switch actively the drive speed according to the operation of the user or the state of the driven object.

Also, in the previous embodiments, three parameters, namely, the sweep direction, the sweep speed, and the frequency resolution were controlled, but another possibility is to control only one or two of these three parameters. For example, when the levels in which the drive speed is adjusted are few, such as when two speed adjustments are made with moving toys, the speed may be controlled by only one or two parameters. When only one or two parameters are controlled, the control circuit 60 may be provided with only one or two of the sweep direction control unit 61, the resolution control unit 62, and the sweep speed control unit 63.

Also, the sweep direction can only be set to two levels, the down direction and the up direction, but the sweep speed and the frequency resolution can be set to two or more levels. Therefore, the number of settings can be set according to the levels in which the required drive speed is adjusted. Specifically, in the second embodiment, the low sweep speed was switched between three levels, but it may also be switched between two levels, or between four or more levels. Also, the frequency resolution was switched between two levels, but it may also be switched between three or more levels.

Furthermore, in the second embodiment, the low sweep speed could be set to the same speed as the high sweep speed, but it may also be set such that it can only be set to a lower speed than the high speed. Configuring the low sweep speed so that it can be set to the same speed as the high sweep speed is advantageous in that the range in which the drive speed is adjusted can be expanded.

The frequency control device 51 is not limited to one that uses a voltage adjustment circuit 54 having the UD counter 544, but may be one that has a voltage adjustment circuit with a plurality of loop filters having different time constants. In other words, the apparatus may be one wherein the frequency of the drive signal outputted from the drive circuit 55 to the piezoelectric element 912 can be swept, and at least one parameter selected from among the sweep direction, the sweep speed, and the frequency resolution can be varied among a plurality of levels.

Furthermore, each device in the control unit may be configured from various logic elements or other such hardware, or may be configured so that the devices are realized by providing a computer that contains a CPU (central processing unit), memory (storage device), and the like to a timepiece or portable device, and incorporating specific programs or data (data stored in the storage sections) into this computer.

The programs and data may be stored in advance in RAM, ROM, or other such memory incorporated into the timepiece or portable device. Also, for example, specific control programs or data may be installed in the timepiece or portable device via the Internet or another such communication device, or a CD-ROM, memory card, or other such storage medium. The devices may be realized by causing the CPU or the like to operate with a program stored in the memory. To install a specific program or the like in the timepiece or portable device, a memory card, CD-ROM, or the like may be directly inserted into the timepiece or portable device, or a device for reading these storage media may be connected to the timepiece or portable device by external mounting. Furthermore, a LAN cable, phone line, or the like may be connected to the timepiece or portable device to load and install a program or the like via wired communication, or the program may be loaded and installed via wireless communication.

If a control program or the like provided by a storage medium, the Internet, or another such communication apparatus is incorporated into the timepiece or portable device, the functions of the present invention can be performed merely by modifying the program, so the control program can be selected and incorporated during factory shipping or as desired by the user. In this case, various timepieces and portable devices with different control systems can be manufactured merely by modifying the program, making it possible to share the components and to greatly reduce manufacturing costs when the products are modified.

Also, the present invention is not limited to being applied to the electronic timepiece described in the previous embodiments. Specifically, the drive method for a piezoelectric actuator according to the present invention or the electronic timepiece that employs the drive apparatus is not limited to a wristwatch, standing clock, wall clock, or other such electronic timepiece, and the present invention can be applied to various electronic devices and is particularly suitable for portable electronic devices for which compactness is a requirement. Examples of such electronic devices include phones, portable phones, personal computers, portable information terminals (PDA), cameras, and other devices with timepiece functions. The present invention can also be applied to film cameras, digital cameras, video cameras, portable phones with camera functions, and other such electronic devices that do not have a timepiece function. When the present invention is applied to electronic devices with a camera function, the drive device of the present invention can be used to drive a focusing mechanism, a zoom mechanism, a lens adjusting mechanism, or the like. Furthermore, the drive device of the present invention may also be used in a drive mechanism for a meter pointer in a measurement device, a drive mechanism in a mobile toy, a drive mechanism for a meter pointer in an instrument panel in an automobile or the like, a piezoelectric buzzer, an inkjet printer head, an ultrasonic motor, or the like.

Also, a piezoelectric actuator was used to drive the date display mechanism of the electronic timepiece 1 in the first embodiment, but the actuator is not limited to this option alone and may also be used to drive time display hands (pointers) in the electronic timepiece 1. Thus, replacing the stepping motor normally used to drive the pointers with a piezoelectric actuator allows the electronic timepiece 1 to be designed as a single thin layer and to be made highly antimagnetic because the piezoelectric actuator is less susceptible to magnetism than the stepping motor.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drive method for a piezoelectric actuator comprising:
    preparing a frequency control device of a piezoelectric actuator and said piezoelectric actuator, said piezoelectric actuator having
        a vibrating body being vibrated by the application of a drive signal with a specific frequency to a piezoelectric element, and
        a contact section being provided on said vibrating body and pressed against a driven object, and
    said frequency control device having
        a first variable frequency oscillator being configured to output a clock signal and to vary a clock signal frequency,
        a voltage adjustment circuit having an up-down counter to input said clock signal outputted from said first variable frequency oscillator, and a digital/analog converter to set a voltage value of output voltage on the basis of a counter value of said up-down counter,
        a second variable frequency oscillator being configured to vary an output signal frequency by voltage outputted from said voltage adjustment circuit, and
        a control circuit, said control circuit having
            a sweep direction control unit to select a sweep direction by switching clock signal input to up input or down input of said up-down counter,
            a sweep speed control unit to control sweep speed by varying said clock signal frequency outputted from said first variable frequency oscillator, and
            a frequency resolution control unit to control frequency resolution by setting the bit number of said up-down counter;
    supplying said drive signal to said piezoelectric element at a frequency being swept within a specific range;
    detecting a detection signal indicating a vibrating state of said vibrating body; and
    controlling a sweep speed of said frequency of said drive signal supplied to said piezoelectric element based on said detection signal.

2. The drive method for a piezoelectric actuator according to claim 1, wherein
    a drive state in which said vibrating body vibrates to drive said driven object, or a non-drive state in which said driven object is not driven is detected on the basis of said detection signal, and
    when said driven object is in said drive state, said sweep speed of said frequency of said drive signal is compared to a speed when said driven object is in said non-drive state and is set to a lower speed.

3. The drive method for a piezoelectric actuator according to claim 2, wherein
    an amplitude of said detection signal is compared to a reference voltage for amplitude detection,
    when said amplitude is less than said reference voltage for amplitude detection, said driven object is determined to be in said non-drive state and said sweep speed of said frequency of said drive signal is set to a first speed setting, and
    when the amplitude is equal to or greater than said reference voltage for amplitude detection, said driven object is determined to be in said drive state and said sweep speed of said frequency of said drive signal is set to a second speed setting lower than said first speed setting.

4. The drive method for a piezoelectric actuator according to claim 3, wherein
    said first speed setting is equal to 2 to 100 times said second speed setting.

5. The drive method for a piezoelectric actuator according to claim 1, wherein
    a drive speed of said piezoelectric actuator is adjusted by switching a sweep direction of said frequency of said drive signal.

6. The drive method for a piezoelectric actuator according to claim 1, wherein
    a drive speed of said piezoelectric actuator is adjusted by switching said sweep speed of said frequency of said drive signal among a plurality of levels.

7. The drive method for a piezoelectric actuator according to claim 1, wherein
    a drive speed of said piezoelectric actuator is adjusted by switching the resolution of said frequency of said drive signal.

8. The drive method for a piezoelectric actuator according to claim 1, wherein
    a drive speed of said piezoelectric actuator is adjusted by controlling at least one parameter selected from among a sweep direction of said frequency of said drive signal, said sweep speed, and a frequency resolution.

9. The drive method for a piezoelectric actuator according to claim 8, wherein
    said drive speed of the piezoelectric actuator is adjusted by first setting said sweep direction of said frequency of said drive signal, secondly setting said sweep speed of said frequency of said drive signal, and thirdly setting said frequency resolution.

10. The drive method for a piezoelectric actuator according to claim 8, wherein
    said sweep direction of said frequency of said drive signal is configured to be switched to an up direction or a down direction,
    said sweep speed of said frequency of said drive signal is configured to be switched between at least two levels of a high speed and a low speed,
    said frequency resolution is configured to be switched between at least two levels of a high resolution and a low resolution, and
    said piezoelectric actuator is driven by switching said sweep direction of said frequency of said drive signal when said sweep speed is set to low and said frequency resolution is set to high, a desired speed of the piezoelectric actuator is equal to or less than said drive speed when said sweep direction is set to down and greater than said drive speed when said sweep direction is set to up, and said sweep direction is set to up when said drive speed is equal to or less than a speed when said sweep direction is set to up.

11. A drive apparatus comprising:
    a piezoelectric actuator having a piezoelectric element, said piezoelectric element having
        a vibrating body being configured to be vibrated by the application of a drive signal with a specific frequency of a drive signal frequency to said piezoelectric element, and
        a contact section being provided on said vibrating body and pressed against a driven object within a specific range;
    a frequency control device being configured to sweep said drive signal frequency of said drive signal being supplied to said piezoelectric element, said frequency control device being configured to detect a detection signal indicating a vibrating state of said vibrating body, and to control a sweep speed of said drive signal frequency being supplied to said piezoelectric element on the basis of said detection signal, said frequency control device having a first variable frequency oscillator being configured to output a clock signal and being configured to vary a clock signal frequency, a voltage adjustment circuit having an up-down counter to input said clock signal outputted from said first variable frequency oscillator, and a digital/analog converter to set a voltage value of output voltage on the basis of a counter value of said up-down counter, a second variable frequency oscillator being configured to vary an output signal frequency by voltage outputted from said voltage adjustment circuit, and a control circuit, said control circuit having a sweep direction control unit being configured to select a sweep direction by switching clock signal input to up input or down input of said up-down counter, a sweep speed control unit being configured to control sweep speed by varying said clock signal frequency outputted from said first variable frequency oscillator, and a frequency resolution control unit being configured to control frequency resolution by setting the bit number of said up-down counter.

12. The drive apparatus for a piezoelectric actuator according to claim 11, wherein said frequency control device has a frequency change control device to perform a control that increases or decreases said drive signal frequency, and a frequency change speed control device to control sweep speed of the increase or decrease of said drive signal frequency, said frequency change control device enables control to increase or to decrease said drive signal frequency of said drive signal within a preset frequency range, and said frequency change speed control device controls said sweep speed of said drive signal frequency on the basis of said detection signal.

13. The drive apparatus for a piezoelectric actuator according to claim 11, wherein said frequency control device has a constant voltage circuit to output an amplitude determination reference voltage to determining the amplitude of said detection signal, an amplitude determination circuit to compare said reference voltage configured to perform amplitude detection outputted by said constant voltage circuit and said amplitude of the detection signal, and to output a comparison result signal, and said voltage adjustment circuit adjusts a speed of change of output voltage on the basis of said comparison result signal.

14. The drive apparatus for a piezoelectric actuator according to claim 13, wherein said voltage adjustment circuit has a clock circuit configured to output a plurality of clock signals with different frequencies, a digital/analog converter configured to set a voltage value of said output voltage on the basis of said counter value of said up-down counter, and said control circuit controls a change pattern of said up-down counter and controls a total speed of said up-down counter by switching said clock signal on the basis of said comparison result signal.

15. The drive apparatus for a piezoelectric actuator according to claim 11, wherein said frequency control device adjusts a speed at which said piezoelectric actuator is driven by switching a direction in which said drive signal frequency is swept.

16. The drive apparatus for a piezoelectric actuator according to claim 11, wherein said frequency control device adjusts a speed at which said piezoelectric actuator is driven by switching a sweep speed of said drive signal frequency.

17. The drive apparatus for a piezoelectric actuator according to claim 11, wherein said frequency control device adjusts a speed at which said piezoelectric actuator is driven by switching the resolution of said drive signal frequency.

18. The drive apparatus for a piezoelectric actuator according to claim 11, wherein said frequency control device adjusts a speed at which said piezoelectric actuator is driven by controlling at least one parameter selected from among a sweep direction of said drive signal frequency, a sweep speed, and a frequency resolution.

19. An electronic device comprising:

a piezoelectric actuator having a vibrating member being configured to vibrate due to the application of a drive signal with a specific frequency to a piezoelectric element, and a contact section being provided on said vibrating member and to contact a driven object; and the drive apparatus for a piezoelectric actuator according to claim 11.

* * * * *